United States Patent
Fujimori et al.

(10) Patent No.: US 7,085,081 B2
(45) Date of Patent: Aug. 1, 2006

(54) OPTICAL DEVICE AND PROJECTOR

(75) Inventors: Motoyuki Fujimori, Suwa (JP); Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/050,711

(22) Filed: Feb. 7, 2005

(65) Prior Publication Data
US 2005/0185245 A1 Aug. 25, 2005

(30) Foreign Application Priority Data
Feb. 10, 2004 (JP) .............................. 2004-033591

(51) Int. Cl.
  G02B 7/02 (2006.01)
(52) U.S. Cl. ...................... 359/820; 359/811
(58) Field of Classification Search ................ 359/819, 359/820, 811; 349/5, 8
See application file for complete search history.

(56) References Cited

U.S. PATENT DOCUMENTS 5,177,994 A * 1/1993 Moriizumi et al. ......... 73/23.34
2003/0035290 A1 * 2/2003 Bornhorst ................... 362/318

FOREIGN PATENT DOCUMENTS

JP   A-03-174134   7/1991
JP   A-2003-233441  8/2003

* cited by examiner

Primary Examiner—Timothy Thompson
Assistant Examiner—Jerry Fang
(74) Attorney, Agent, or Firm—Oliff & Berridge, PLC

(57) ABSTRACT

An optical device (44) includes fluid circulating member link sections (446) that can link a plurality of fluid circulating members (448). The fluid circulating member link sections (446) are arranged respectively between a main tank (445) and an optical device main body (440) and between a radiator (447) and the optical device main body (440) to allow the optical device main body (440) to be fitted to and removed from the main tank (445) and the radiator (447).

18 Claims, 14 Drawing Sheets

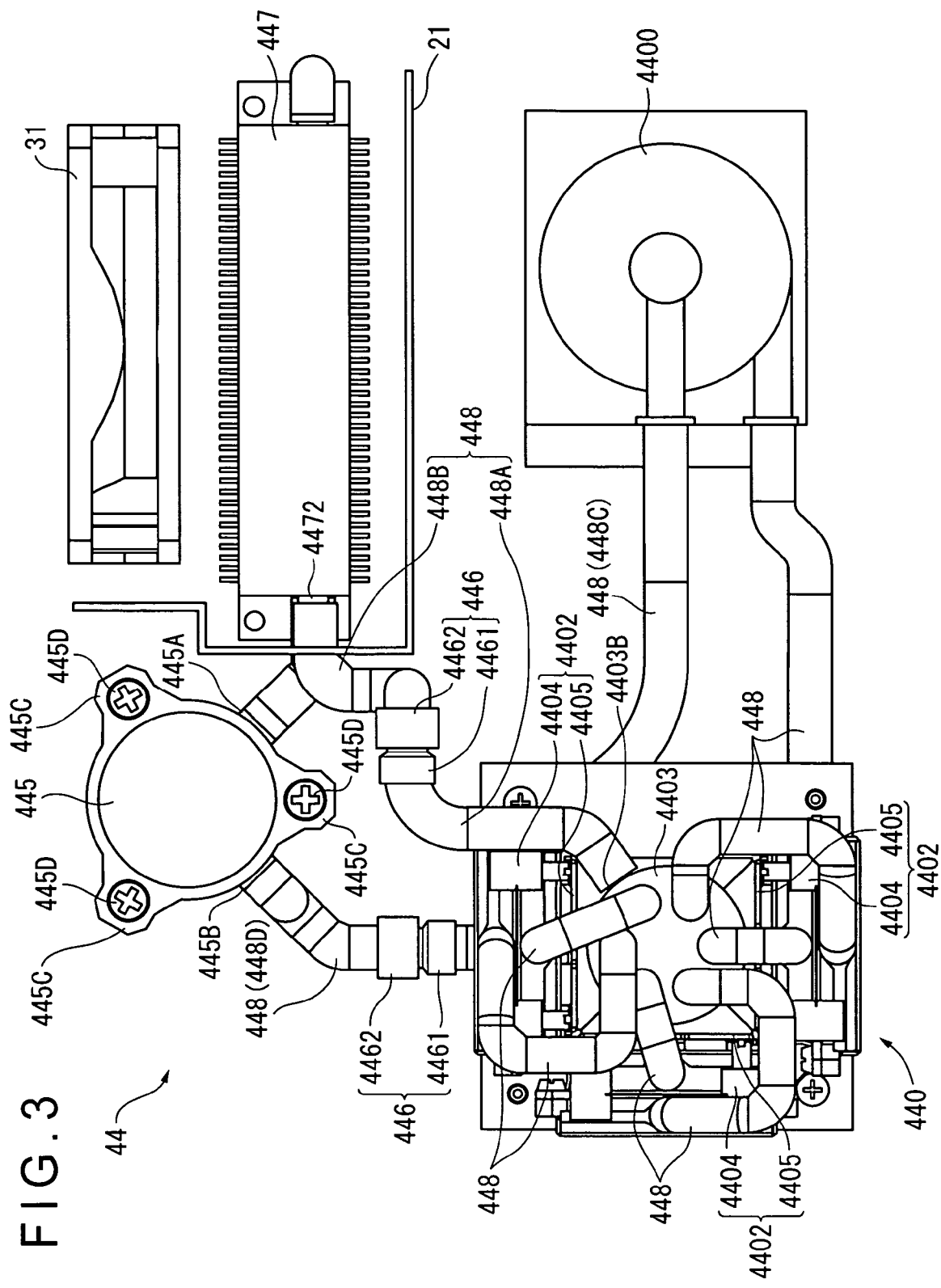

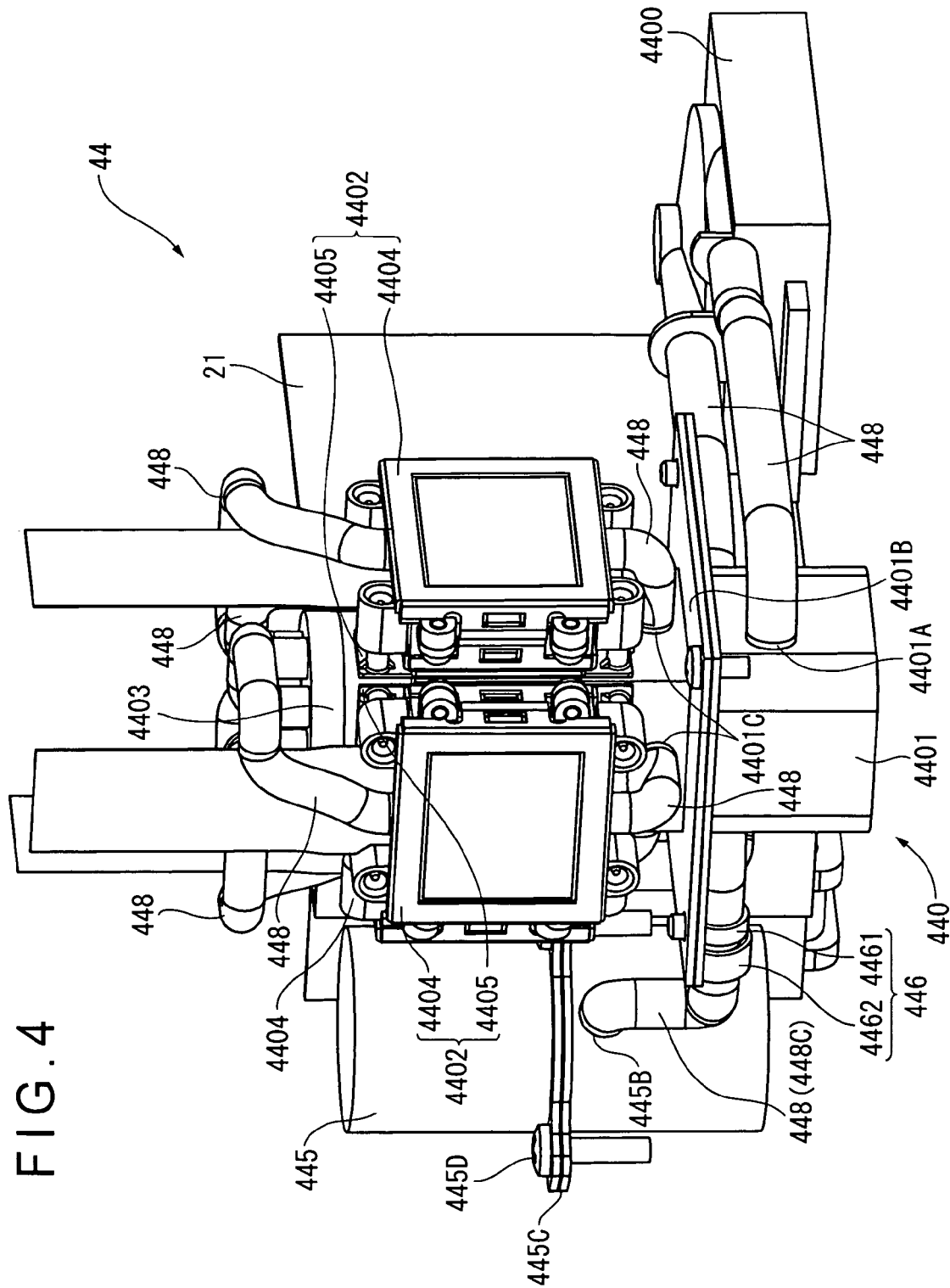

OPTICAL DEVICE AND PROJECTOR

BACKGROUND OF THE INVENTION

1. Field of the Invention

The present invention relates to an optical device and a projector.

2. Description of Related Art

Conventionally, projectors including a plurality of optical modulators for modulating light beams emitted from a light source according to image information and forming an optical image, a color combining optical device for combining the light beams modulated by the optical modulators into a light beam and a projection optical device for enlarging and projecting the light beam combined by the color combining optical device are known.

Of the above listed components, the optical modulators are generally realized by using an active matrix drive type optical modulators formed by filling a gap between a pair of substrates with an electro-optic material such as liquid crystal and hermetically sealing the gap. More specifically, the paired substrates of the optical modulator include a drive substrate arranged at the light beam emitting side to apply a drive voltage to the liquid crystal, data lines, scanning lines, switching elements and pixel electrodes being formed thereon, and an opposite substrate arranged at the light beam incident side on which a common electrode and a black matrix are formed.

A light beam incident-side polarization plate and a light beam irradiation-side polarization plate that transmit light beams having a predetermined polarization axis are arranged respectively at the light beam incident side and the light beam emitting side of the optical modulator.

When the optical modulators are irradiated with the light beams that are emitted from the light source, the temperature of the optical modulators is apt to rise due to absorption of light by a liquid crystal layer as well as by the data lines and the scanning lines formed on the drive substrate and also by the black matrix formed on the opposite substrate. Additionally, of the light beams emitted from the light source and the light beams transmitted through the optical modulators, those that do not have a predetermined polarization axis are absorbed by the incident-side polarization plate and the irradiation-side polarization plate. Therefore, the polarizing plates are apt to emit heat.

Thus, projectors containing such an optical element and provided with a cooling device using a cooling fluid for the purpose of reducing the temperature rise of the optical element have been proposed (see, for example, Reference Document 1: Japanese Patent Laid-Open Publication No. Hei 3-174134).

The cooling device described in Reference Document 1 has a substantially cubic cabinet having a pair of oppositely disposed open end facets and a cooling chamber contained in the cabinet and filled with cooling fluid. An optical modulator is arranged at one of the oppositely disposed open end facets and a incident-side polarization plate is arranged at the other open end facet to close the open end facets respectively by the optical modulator and the incident-side polarization plate, thereby forming the cooling chamber. With the above-described arrangement, the heat generated in the optical modulator and the incident-side polarization plate by the light beam irradiated from the light source is directly discharged into the cooling fluid.

However, since cooling fluid is filled in the cooling chamber and the cooling chamber is hermetically sealed in the cooling device described in Reference Document 1, the cooling fluid is apt to be heated by the optical modulator and the polarizing plate that emit heat so that the warmed cooling fluid remains in the cooling chamber. Therefore, there is a problem that the temperature difference between the optical modulator and the cooling fluid becomes small to make it difficult to efficiently cool the optical modulator.

Reference Document 2 (Japanese Patent Laid-Open Publication No. 2003-233441) describes a liquid cooling system proposed to dissolve the above-identified problem. According to Reference Document 2, the cooling fluid in the cooling chamber is guided to the outside and then returned to the cooling chamber so as to make the cooling liquid always circulate.

The liquid cooling system described in the Reference Document 2 has a pump, a jacket and a reserve tank mounted on a heat emitting plate and the pump, the jacket and the reserve tank are connected to each other by way of pipes to allow the cooling fluid to circulate. Thus, as such a liquid cooling system is incorporated into a projector as described in Reference Document 1 or the jacket of the liquid cooling system is replaced by a cooling device as described above, it is possible to forcibly flow in and flow out the cooling fluid by the pump and cause the cooling fluid to constantly flow through the cooling chamber in order to avoid warmed cooling fluid remaining in the cooling chamber and efficiently cool the optical modulator.

However, when the liquid cooling system as described in Reference Document 2 is incorporated into the projector as described in Reference Document 1, the liquid cooling system that is dimensionally large provides a handling disadvantage. Then, it is difficult to place the optical modulator at the right position relative to the optical axis of the light beam emitted form the light source. When the optical modulator is displaced from the right position relative to the optical axis of the light beam emitted from the light source as described above, unnecessary light is projected on the screen.

SUMMARY OF THE INVENTION

In view of the above-identified circumstances, it is therefore a major object of the present invention to provide an optical device and a projector in which an optical modulator can be placed at the right position with ease.

In an aspect of the present invention, the above object is achieved by providing an optical device having an optical modulator for modulating a light beam emitted from a light source according to image information, the device including: an optical modulator holder having a cooling chamber formed therein, the cooling chamber containing cooling fluid therein in a hermetically sealed state, and holding the optical modulator so as to be capable of transmitting heat to the cooling fluid in the cooling chamber; a plurality of fluid circulating members connected to and communicating with the cooling chamber of the optical modulator holder and adapted to guide the cooling fluid to the outside of the cooling chamber and back into the cooling chamber; fluid circulating member link sections adapted to link the plurality of fluid circulating members; a cooling fluid accumulating section arranged on a flow path of the cooling fluid of the plurality of fluid circulating members to accumulate cooling fluid; a pressurized fluid feeding section arranged on the flow path of the cooling fluid of the plurality of fluid circulating members to feed cooling fluid under pressure via the plurality of fluid circulating members and forcibly circulate it; and a heat emitting section arranged on the flow path of the cooling fluid of the plurality of fluid circulating members to emit heat from the cooling fluid, in which the fluid circulating member link sections are arranged at least at two positions interlinking the cooling fluid accumulating section, the pressurized fluid feeding section, the heat emitting section and the optical modulator holder; and the optical modulator holder is removably fitted at least to the cooling fluid accumulating section, the pressurized fluid feeding section or the heat emitting section.

Here, it is sufficient for the fluid circulating member link sections to removably fit the fluid circulating members to be linked to itself. For example, the fluid circulating member link sections may be formed as a single integral unit and the fluid circulating members may be linked by the single integral unit of fluid circulating member link sections. Alternatively, the fluid circulating member link sections may be formed as two units and the fluid circulating members may be linked by the two units of fluid circulating member link sections.

Since the fluid circulating member link sections of an optical device according to the present invention are arranged at least at two of the cooling fluid accumulating section, the pressurized fluid feeding section, the heat emitting section and the optical modulator holder, the optical modulator holder can be removably fitted at least to the cooling fluid accumulating section, the pressurized fluid feeding section or the heat emitting section. As a result, when the optical device is incorporated in an optical equipment, which may typically be a projector adapted to be mounted by the optical device, it is incorporated in the optical equipment with the optical modulator holder removed relative to at least the cooling fluid accumulating section, the pressurized fluid feeding section or the heat emitting section and subsequently the optical modulator holder may be fitted at least to the cooling fluid accumulating section, the pressurized fluid feeding section or the heat emitting section by the fluid circulating member link sections. Therefore, the optical device can be handled with ease and the optical modulator holder can easily be placed at a right position relative to an optical axis of the light beam emitted from the light source. In other words, the optical modulator can be aligned to the predetermined position with ease.

Preferably, in an optical device according to the present invention, a plurality of optical modulators and a plurality of optical modulator holders are provided, the number of optical modulator holders being corresponding to the number of optical modulators; the optical device further including: a color combining optical device having a plurality of light beam incident side end facets for receiving the plurality of optical modulator holders fitted thereto and adapted to combine light beams of different colors modulated by the plurality of optical modulators and emit the combined light beam; a fluid branching section fitted to either of the end facets intersecting the plurality of light beam incident side end facets of the color combining optical device and dividing internal cooling fluid for and feeding it out to the plurality of optical modulator holders via the plurality of the fluid circulating members; and a cooling fluid relay section fitted to the other end facet intersecting the plurality of light beam incident side end facets of the color combining optical device and adapted to collectively feed in the plurality of cooling fluid from the optical modulator holders via the plurality of fluid circulating members; an optical device main body being formed by integrating the plurality of optical modulator holders, the color combining optical device, the fluid branching section and the cooling fluid relay section; the fluid circulating member link sections being arranged at least at two positions interlinking the cooling fluid accumulating section, the pressurized fluid feeding section, the heat emitting section and the optical device main body; the optical device main body being removably fitted at least to the cooling fluid accumulating section, the pressurized fluid feeding section or the heat emitting section.

Thus, according to the present invention, an optical device main body is formed by integrating a plurality of optical modulators, a plurality of optical modulator holders, a color combining optical device, a fluid branching section and a cooling fluid relay section. Therefore, if an optical device according to the present invention includes a plurality of optical modulators, they are integrated into a unitized optical device main body and hence it is possible to downsize the optical device.

Additionally, the fluid circulating member link sections constituting the optical device are arranged at least at two positions interlinking the cooling fluid accumulating section, the pressurized fluid feeding section, the heat emitting section and the optical device main body. Therefore, the optical device main body can be removably fitted at least to the cooling fluid accumulating section, the pressurized fluid feeding section or the heat emitting section. With this arrangement, when the optical device is incorporated into an optical equipment such as a projector in which the optical device is to be mounted, it may be incorporated with the optical device main body removed from at least the cooling fluid accumulating section, the pressurized fluid feeding section or the heat emitting section and subsequently the optical device main body may be fitted to at least the cooling fluid accumulating section, the pressurized fluid feeding section or the heat emitting section by the fluid circulating member link sections. Therefore, if an optical device according to the present invention includes a plurality of optical modulators, it can be handled with ease and the optical device main body can easily be placed at a right position relative to the optical axis of the light beam emitted from the light source. In other words, the optical modulator can be aligned to the predetermined position with ease.

Preferably, in an optical device according to the present invention, the pressurized fluid feeding section is arranged upstream of flowing cooling fluid relative to the fluid branching section and integrated with the fluid branching section by one of the fluid circulating members and the optical device main body is formed to include the pressurized fluid feeding section, while the cooling fluid accumulating section and the heat emitting section are integrated by another one of the fluid circulating members and arranged on the flow path of the cooling fluid flowing out from the cooling fluid relay section to the pressurized fluid feeding section and the fluid circulating member link sections are arranged respectively between the cooling fluid accumulating section and the heat emitting section and the cooling fluid relay section and between the cooling fluid accumulating section and the heat emitting section and the pressurized fluid feeding section; the optical device main body being removably fitted to the cooling fluid accumulating section and the heat emitting section.

Thus, according to the present invention, an optical device main body is formed by integrating a plurality of optical modulator holders, a color combining optical device, a fluid branching section and a cooling fluid relay section as well as a pressurized fluid feeding section. Therefore, it is possible to efficiently lay out those members and squeeze out the space for arranging the fluid circulating members so that the optical device can be further downsized and handled with ease.

Preferably, in an optical device according to the present invention, the fluid branching section has a cooling fluid flow-in section for allowing cooling fluid to flow into the inside thereof and the cooling fluid accumulating section has a cooling fluid feed-out section for allowing cooling fluid to be fed out to the outside thereof and is adapted to be removably fitted to the fluid branching section so that, when the cooling fluid accumulating section is fitted to the fluid branching section, the cooling fluid flow-in section and the cooling fluid feed-out section are connected to each other to flow cooling fluid into the fluid branching section, while the optical device main body is formed to include the cooling fluid accumulating section and the fluid circulating member link sections are arranged at least at two positions interlinking the pressurized fluid feeding section, the heat emitting section and the optical device main body, the optical device main body being removably fitted at least to the pressurized fluid feeding section or the heat emitting section.

Thus, according to the present invention, the cooling fluid accumulating section is removably fitted to the fluid branching section so that, when it is fitted to the fluid branching section, cooling fluid can flow from the inside thereof into the fluid branching section via the cooling fluid feed-out section and the cooling fluid flow-in section of the fluid branching section. Then, an optical device main body is formed by integrating a plurality of optical modulator holders, a color combining optical device, a fluid branching section and a cooling fluid relay section as well as a cooling fluid accumulating section. Therefore, it is possible to efficiently lay out those members and squeeze out the space for arranging the fluid circulating members so that the optical device can be further downsized and handled with ease.

Additionally, since it is not necessary to connect the cooling fluid accumulating section and the fluid branching section by a fluid circulating member, the number of connections is reduced to prevent circulating cooling fluid from leaking.

Preferably, in an optical device according to the present invention, the pressurized fluid feeding section is arranged upstream of flowing cooling fluid relative to the fluid branching section and integrated with the fluid branching section by one of the fluid circulating members and the optical device main body is formed to include the pressurized fluid feeding section, while the fluid circulating member link sections are arranged respectively on the flow path from the optical device main body to the heat emitting section and on the flow path from the heat emitting section to the optical device main body, the optical device main body being removably fitted to the heat emitting section.

Thus, according to the present invention, an optical device main body is formed by integrating a plurality of optical modulator holders, a color combining optical device, a fluid branching section, a cooling fluid relay section and a cooling fluid accumulating section as well as a pressurized fluid feeding section so as to maximally integrate the components of the optical device into the optical device main body. Therefore, it is possible to efficiently lay out those members and squeeze out the space for arranging the fluid circulating members so that the optical device can be further downsized and handled with ease.

Preferably, in an optical device according to the present invention, the cooling fluid flow-in section is formed to include a cooling fluid flow-in hole adapted to flow cooling fluid into the inside thereof and a flow-in valve for closing the cooling fluid flow-in hole and the cooling fluid feed-out section is formed to include a cooling fluid feed-out hole adapted to feed out cooling fluid to the outside thereof and a feed-out valve for closing the cooling fluid feed-out hole, the fluid branching section and the cooling fluid accumulating section being provided respectively with valve moving sections for moving the feed-out valve and the flow-in valve so as to open the cooling fluid feed-out hole and the cooling fluid flow-in hole at the time of being connected to each other.

Thus, according to the present invention, when the cooling fluid accumulating section is fitted to the fluid branching section, the cooling fluid flow-in hole of the fluid branching section is closed by the flow-in valve and the cooling fluid feed-out hole of the cooling fluid accumulating section is closed by the feed-out valve. Therefore, neither the cooling fluid in the fluid branching section is exposed to the atmosphere by way of the cooling fluid flow-in hole nor the cooling fluid in the cooling fluid accumulating section is exposed to the atmosphere via the cooling fluid feed-out hole when the cooling fluid accumulating section is fitted to the fluid branching section. Then, it is possible to prevent dust from entering the cooling fluid because the cooling fluid is not exposed to the atmosphere and hence the light beams passing through the cooling chambers would not be blocked by dust. Thus, the optical device can maintain forming high quality images.

Preferably, in an optical device according to the present invention, the cooling fluid flow-in section and the cooling fluid feed-out section have respective valve urging sections for urging the flow-in valve and the feed-out valve to close the cooling fluid flow-in hole and the cooling fluid feed-out hole.

The valve urging sections may be urging members such as leaf springs or coil springs or elastic resilient members typically made of rubber.

Thus, according to the present invention, since the cooling fluid flow-in section has a valve urging section, the flow-in valve is moved to open the cooling fluid flow-in hole by the valve moving section of the cooling fluid accumulating section when the cooling fluid accumulating section is fitted to the fluid branching section, whereas the flow-in valve is urged to close the cooling fluid flow-in hole by the valve urging section of the fluid branching section when the cooling fluid accumulating section is removed from the fluid branching section. Therefore, when an operation of replacing the cooling fluid accumulating section is going on, cooling fluid does not leak from the inside of the fluid branching section to the outside via the cooling fluid flow-in hole so that cooling fluid is prevented from leaking into the optical equipment, which may typically be a projector, in which the optical device is mounted. Additionally, the cooling fluid in the fluid branching section is not exposed to the outside via the cooling fluid flow-in hole. Thus, the optical device can maintain forming high quality images.

Similarly, since the cooling fluid feed-out section also has a valve urging section, the feed-out valve is moved to open the cooling fluid feed-out hole by the valve moving section of the fluid branching section when the cooling fluid accumulating section is fitted to the fluid branching section, whereas the feed-out valve is urged to close the cooling fluid feed-out hole by the valve urging section of the cooling fluid accumulating section when the cooling fluid accumulating section is removed from the fluid branching section. When the cooling fluid accumulating section is removed from the fluid branching section to replace the cooling fluid accumulating section, the cooling fluid remaining in the cooling fluid accumulating section does not leak to the outside via the cooling fluid feed-out hole so that cooling fluid is prevented from leaking into the optical equipment, which may typically be a projector, in which the optical device is mounted.

Preferably, in an optical device according to the present invention, the fluid circulating member link sections are arranged corresponding to the fluid circulating members to be linked and each of the fluid circulating member link sections includes a first link section and a second link section adapted to be connected to each other to link the related fluid circulating members, the first link section and the second link section being formed to include a flow hole for allowing cooling fluid to flow in the inside, a flow valve for closing the flow hole, a valve moving section for moving the flow valve to open the flow hole when the first link section and the second link section are connected to each other and an engaging section adapted to engage each other.

Thus, according to the present invention, each of the fluid circulating member link sections includes a first link section and a second link section. When the first link section and the second link section are connected to each other, their flow valves are moved to open their respective flow holes by their valve moving sections. The first link section and the second link section are connected to each other as the engaging sections engage each other. Additionally, the second link section can be removed from the first link section by disengaging the engaging sections. Thus, it is possible to link the fluid circulating members with ease and handle optical device with ease.

Additionally, each flow hole is closed by the corresponding flow valve before the first link section and the second link section are connected to each other. Therefore, the operation of connecting the fluid circulating members can be conducted with the flow paths in the optical device filled with cooling fluid before connecting the fluid circulating members by the fluid circulating member link sections. Thus, it is possible to link the fluid circulating members with ease and handle optical device with ease. Still additionally, the cooling fluid in the optical device is not exposed to the atmosphere even in a state where the flow paths in the optical device are filled with cooling fluid before connecting the fluid circulating members by the fluid circulating member link sections so that it is possible to prevent dust from entering the cooling fluid.

Preferably, in an optical device according to the present invention, the first link sections and the second link sections are provided with respective flow valve urging sections for urging the flow valves to close the flow holes.

Like the above-described valve urging sections, the flow valve urging sections may be urging members such as leaf springs or coil springs or elastic resilient members typically made of rubber.

Thus, according to the present invention, since the first link sections and the second link sections are provided with respective flow valve urging sections, when each of the second link sections is removed from the corresponding first link section, their flow valves are moved by the respective flow valve urging sections to close the flow holes. Therefore, cooling fluid does not leak to the outside if the second link section is removed from the first link section in a state where the flow paths in the optical device are filled with cooling fluid. Then, the optical device main body can be mounted in position and removed from its position with the flow paths in the optical device filled with cooling fluid and hence the optical device can be handled with ease. Additionally, the cooling fluid in the optical device is not exposed to the atmosphere if each of the second link sections is removed from the corresponding first link section so that it is possible to prevent dust from entering the cooling fluid.

In another aspect of the present invention, there is provided a projector including a light source device, an optical device described above and a projection optical device for enlarging and projecting the optical image formed by the optical device.

Thus, since a projector according to the present invention includes an optical device described above, it provides advantages similar to those described above for the optical device.

Additionally, since the optical modulators of a projector according to the present invention can be arranged at respective predetermined positions relative to the optical axes of the light beams emitted from the light source thereof, no unnecessary light is projected onto the screen so that a viewer can enjoy excellent projected images.

BRIEF DESCRIPTION OF THE DRAWINGS

FIG. 3 is a plan view of an optical device of the aforesaid embodiment seen from above;

FIG. 4 is a perspective view of the optical device of the aforesaid embodiment as viewed from back side;

DETAILED DESCRIPTION OF PREFERRED EMBODIMENTS

1st Embodiment

Now, a first embodiment of the present invention will be described below by referring to the accompanying drawings.

[Configuration of Projector]

Figure 1:
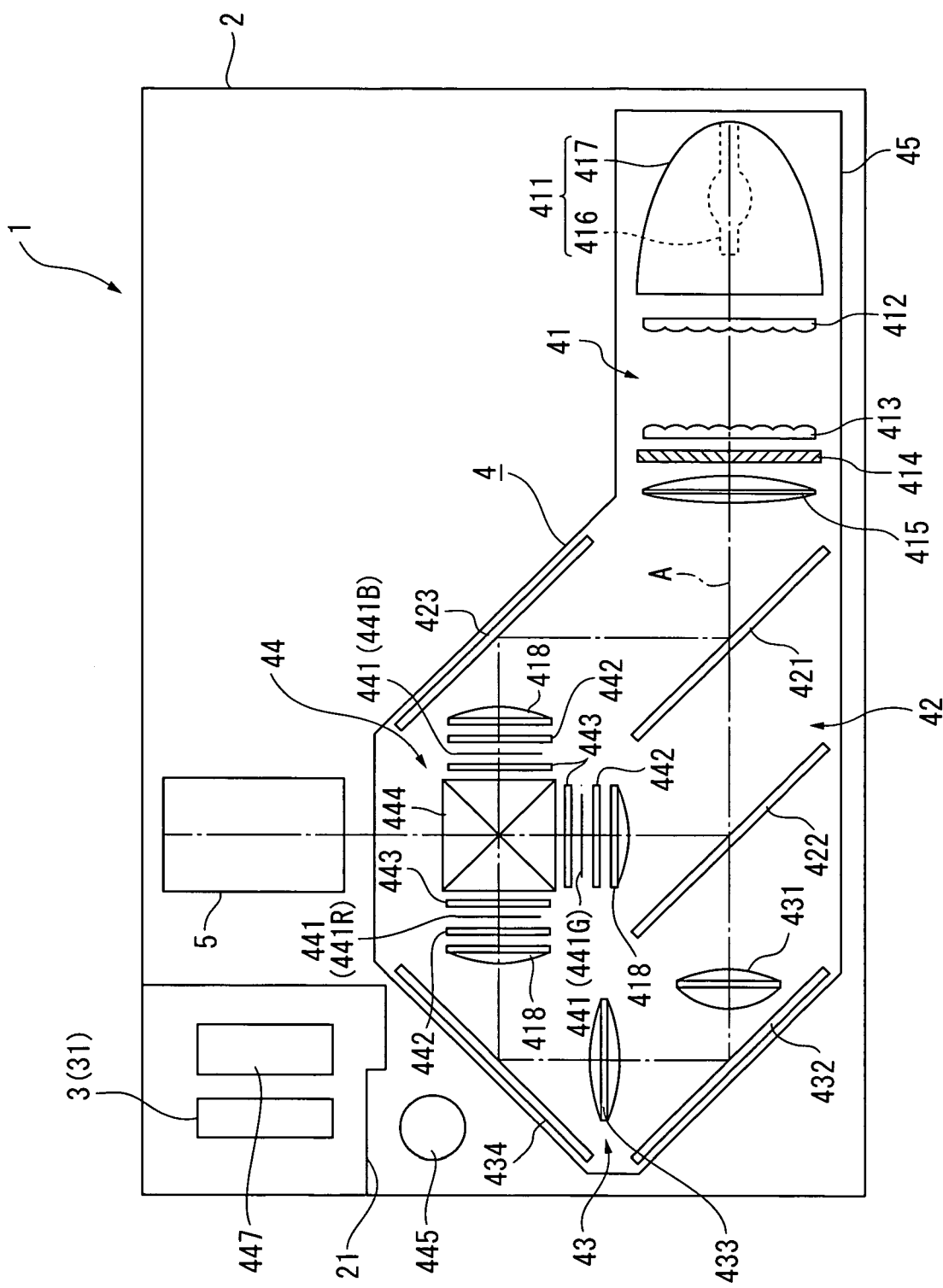
FIG. 1 is a schematic illustration of a projector according to the present invention, showing the configuration thereof, which illustration is applicable to each of the preferred embodiments of the present invention.

FIG. 1 is a schematic illustration of a projector 1, showing the configuration thereof.

The projector 1 forms an optical image by modulating the light beam emitted from a light source and enlarging and projecting the formed optical image onto a screen. The projector 1 includes a exterior case 2, a cooling unit 3, an optical unit 4 and a projection lens 5 that is an optical projection device.

Note that, although not shown, a power source block, a lamp drive circuit and other components are arranged in the space not occupied by the cooling unit 3, the optical unit 4 and the projection lens 5.

The exterior case 2 is typically made of synthetic resin and has a substantially cubic profile so as to contain the cooling unit 3, the optical unit 4 and the projection lens 5 in the in side. Although not shown, the exterior case 2 includes an upper case that defines the top surface, the front surface, the rear surface and the lateral surfaces of the projector 1 and a lower case that defines the bottom surface, the front surface, the lateral surfaces and the rear surface of the projector 1, the upper case and the lower case being rigidly secured to each other typically by means of screws.

Note that it is not necessary that the exterior case 2 is made of synthetic resin and may alternatively be made of some other material such as metal.

Although not shown, the exterior case 2 is provided with air suction ports (e.g., air suction ports 22 shown in FIG. 2) for introducing cooling air from the outside into the inside of the projector 1 and air discharge ports for discharging air warmed in the inside of the projector 1 to the outside by means of the cooling unit 3.

Additionally, as shown in FIG. 1, the exterior case 2 is provided with a partition wall 21 arranged along a lateral side of the projection lens 5 and near a corner of the exterior case 2 so as to separate the radiator of the optical device of the optical unit 4, which will be described in greater detail hereinafter, from other members.

The cooling unit 3 feeds cooling air into the cooling flow path formed in the inside of the projector 1 to reduce the heat generated in the projector 1. The cooling unit 3 is arranged in the inside of the space defined by the exterior case 2 and the partition wall 21 and includes an axial-flow fan 31 for introducing external cooling air form the suction ports 22 (see FIG. 2) formed in the exterior case 2 into the inside of the projector 1 and blowing cooling air onto the radiator, which will be described hereinafter.

Although not shown, the cooling unit 3 includes a light source unit of the optical unit 4, which will be described hereinafter, a power supply block (not shown) and a cooling fan for cooling the lamp drive circuit and so on in addition to the axial-flow fan 31.

The optical unit 4 is a unit adapted to optically process the light beams emitted from the light source and form an optical image (color image) according to the image information applied to it. As shown in FIG. 1, the optical unit 4 shows a substantially L-shaped profile and extends along the rear surface of the exterior case 2 and also along a lateral surface of the exterior case 2. The configuration of the optical unit 4 will be described in greater detail hereinafter.

The projection lens 5 is a lens assembly formed by combining a plurality of lenses. The projection lens 5 is adapted to enlarge the optical image (color image) formed by the optical unit 4 and project it on a screen (not shown).

[Detailed Configuration of the Optical Unit]

As shown in FIG. 1, the optical unit 4 includes an integrator illuminating optical system 41, a color separation optical system 42, a relay optical system 43, a part of an optical device 44 and an optical component casing 45 for containing the optical components 41 through 44 in an organized manner.

The integrator illuminating optical system 41 is an optical system for uniformly illuminating the image forming region of the liquid panel of the optical device 44, which will be described hereinafter. As shown in FIG. 1, the integrator illuminating optical system 41 includes a light source device 411, a first lens array 412, a second lens array 413, a polarization converter 414, and a superposing lens 415.

The light source device 411 includes a light source lamp 416 and a reflector 417 for reflecting light emitted from the light source lamp 416. The light source lamp 416 may typically be a halogen lamp, a metal halide lamp or a high pressure mercury lamp. While a parabolic reflection mirror is used for the reflector 417 in FIG. 1, the present invention is by no means limited thereto and an elliptic reflection mirror may alternatively be used for the reflector 417 in combination with a parallelizing concave lens that is arranged at the light beam emitting side to parallelize the light beam reflected by the elliptic reflection mirror.

The first lens array 412 is formed by arranging small lenses, each showing a substantially rectangular contour as viewed along the optical axis, in the form of a matrix. The small lenses are used to divide the light beam emitted from the light source device 411 into a plurality of partial light beams.

The second lens array 413 has a configuration substantially the same as the first lens array 412. In other words, it is formed by arranging small lenses in the form of a matrix. The second lens array 413 cooperates with the superposing lens 415 to form images of the light beams coming from the small lenses of the first lens array 412 on the liquid crystal panels of the optical device 44, which will be described hereinafter.

The polarization converter 414 is arranged between the second lens array 413 and the superposing lens 415 to convert the light from the second lens array 413 into beams of polarized light of substantially the same kind.

More specifically, the partial light beams converted by the polarization converter 414 into beams of polarized light of the same kind are ultimately laid one on the other on each of the liquid crystal panels of the optical device 44 by the superposing lens 415. Since a projector using liquid crystal panels of the type adapted to modulate polarized light can utilize polarized light of only a single kind, it cannot utilize almost a half of light emitted from the light source device 411 that emits randomly polarized light. Thus, light emitted from the light source device 411 is converted into polarized light of substantially the same kind by means of the polarization converter 414 to raise the efficiency of utilization of light at the optical device 44.

As shown in FIG. 1, the color separation optical system 42 includes a pair of dichroic mirrors 421, 422 and a reflection mirror 423. It operates to separate the plurality of partial light beams emitted from the integrator illuminating optical system 41 into light beams of three colors of red, green and blue by means of the dichroic mirrors 421, 422.

As shown in FIG. 1, the relay optical system 43 includes an incident-side lens 431, a relay lens 433 and reflection mirrors 432, 434. It operates to lead red light separated by the color separation optical system 42 to the liquid crystal panel for red light of the optical device 44, which will be described hereinafter.

The dichroic mirror 421 of the color separation optical system 42 reflects the blue light component of the light beams emitted from the integrator illuminating optical system 41 and transmits the red light component and the green light component. Blue light reflected by the dichroic mirror 421 is reflected by the reflection mirror 423 and gets to the liquid crystal panel for blue light of the optical device 44, which will be described in greater detail hereinafter by way of field lens 418 for blue light. The field lens 418 for blue light converts the partial light beams emitted from the second lens array 413 into those running in parallel with the central axis (main optical axis) thereof. This description also applies to the field lenses 418 arranged at the light incident sides of the liquid crystal panels for green light and red light.

Of red light and green light transmitted through the dichroic mirror 421, green light is reflected by the dichroic mirror 422 and gets to the liquid crystal panel for green light of the optical device 44, which will be described hereinafter, by way of the field lens 418 for green light. On the other hand, red light is transmitted through the dichroic mirror 422 and passes through the relay optical system 43 and the field lens 418 for red light before it gets to the liquid crystal panel for red light of the optical device 44, which will be described hereinafter. The relay optical system 43 is used for red light in order to prevent the efficiency of utilization of light from falling due to dispersion of light and other problems because the light path of red light is longer than blue light and green light. In other words, the relay optical system 43 is used in order to convey the partial light beams entering the incident-side lens 431 entirely to the field lens 418 for red light.

As shown in FIG. 1, the optical device 44 has three liquid crystal panels 441 (liquid crystal panel 441R for red light, liquid crystal panel 441G for green light and liquid crystal panel 441B for blue light) that operate as optical modulators, incident-side polarization plates 442 and irradiation-side polarization plates 443 arranged respectively at the light beam incident sides and the light beam emitting sides of the liquid crystal panels 441 and a cross dichroic prism 444 that is a color combining optical device as integral parts thereof.

While the specific configuration will be described in greater detail hereinafter, the optical device 44 includes a main tank, a pressurized fluid feeding section, a radiator, fluid circulating members, fluid branching sections, optical modulator holders and a relay tank in addition to the liquid crystal panels 441, the incident-side polarization plates 442, the irradiation-side polarization plates 443 and the cross dichroic prism 444.

Although not specifically shown, each of the liquid crystal panels 441 is formed by filling the gap between a pair of transparent glass substrates with liquid crystal that is an electrooptical substance and hermetically sealing the gap. The orientation of the liquid crystal is controlled as a function of the drive signal output from a control unit (not shown) to modulate the direction of polarization of polarized light beams emitted from the corresponding incident-side polarization plate 442.

Each of the incident-side polarization plates 442 receives light beams that are polarized substantially to the same direction by the polarization converter 414 and transmits only light beams that are polarized substantially in the direction the same as the axis of polarization of the light beams polarized substantially to the same direction by the polarization converter 414, while it absorbs other light beams. The incident-side polarization plates 442 are formed by applying polarizing film to a light transmitting substrate typically made of sapphire glass or crystal.

The irradiation-side polarization plates 443 have a configuration substantially the same as the incident-side polarization plates 442. Each of the irradiation-side polarization plates 443 transmits only light beams having an axis of polarization perpendicular to the axis of transmission of light beams of the corresponding incident-side polarization plate 442 and absorbs other light beams.

The cross dichroic prism 444 is an optical element for combining the optical images modulated for each of the colors of the light beams emitted from the irradiation-side polarization plates 443 to form a color image. The cross dichroic prism 444 is formed by bonding four rectangular prisms and shows a substantially square contour. Two dielectric multilayer films are formed along the interfaces of the bonded rectangular prisms. The dielectric multilayer films reflect beams of color light emitted from the liquid crystal panels 441R, 441B and coming through the corresponding irradiation-side polarization plates 443 respectively and transmit beams of color light emitted from the liquid crystal panel 441G and coming through the irradiation-side polarization plate 443. In this way, beams of color light of different colors modulated by the liquid crystal panels 441R, 441G, 441B are combined to form a color image.

Figure 2:
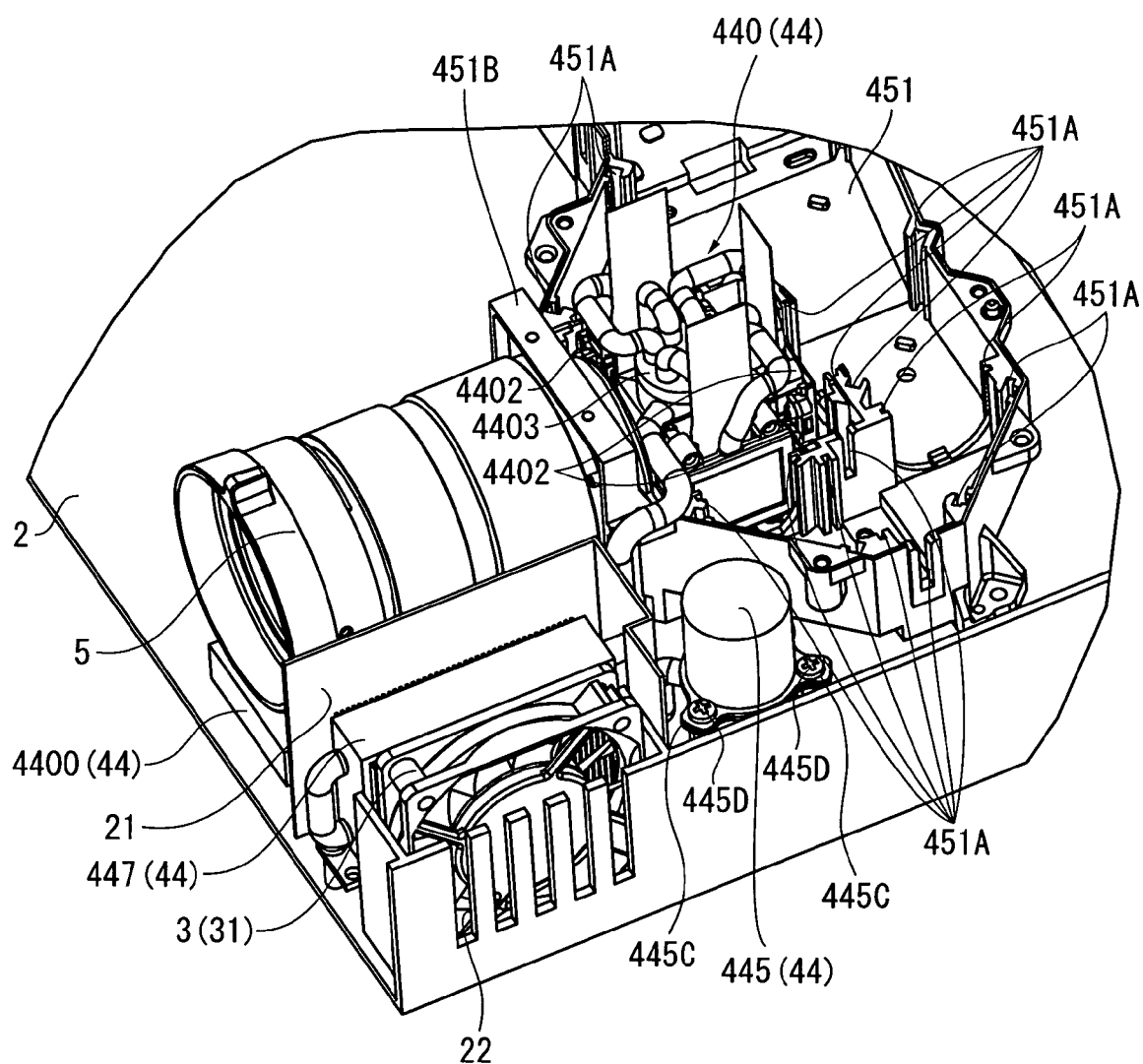
FIG. 2 is a perspective view of part of a first embodiment of projector seen from above.

FIG. 2 is a perspective view of part of the projector 1 seen from above. Note that, for the simplicity of description, FIG. 2 shows only the optical device main body of the optical device 44, which will be described in greater detail hereinafter, out of the optical components contained in the optical component casing 45 and the remaining optical components 41 through 43 are omitted from FIG. 2.

The optical component casing 45 is typically a metal-made member. As shown in FIG. 1, a predetermined lighting optical axis A is defined in the inside and the above listed optical components 41 through 43 and the optical device main body of the optical device 44, which will be described hereinafter, are arranged at predetermined respective positions relative to the lighting optical axis A and contained in the optical component casing 45. However, the casing 45 may alternatively be made of any thermally conductive material other than metal. As shown in FIG. 2, the optical component casing 45 includes a container-shaped component containing member 451 for containing the optical components 41 through 43 and the optical device main body of the optical device 44, which will be described hereinafter, and a lid-shaped member for closing the aperture of the component containing member 451.

Of the above members, the component containing member 451 defines the bottom side, the front side and the lateral sides of the optical component casing 45.

As shown in FIG. 2, the component containing member 451 is provided on the inner surfaces of the lateral sides thereof with grooves 451A for receiving the above listed optical components 412 through 415, 418, 421 through 423, 431 through 434 that come into the respective grooves 451A, sliding from above.

As shown in FIG. 2, a projection lens arranging section 451B for arranging the projection lens 5 relative to the optical unit 4 is formed at the front end of the lateral walls of the component containing member 451. The projection lens arranging section 451B shows a substantially rectangular contour in a plan view and provided at the center thereof in the plan view with a circular hole (not shown) that corresponds to the light beam emitting position of the optical device 44 so that the color image formed by the optical unit 4 is enlarged and projected from the projection lens 5 through the circular hole.

[Configuration of the Optical Device]

FIG. 3 is a plan view of the optical device 44 seen from above.

FIG. 4 is a perspective view of the optical device as viewed from back side.

As shown in FIGS. 2 through 4, the optical device 44 includes an optical device main body 440 in which the liquid crystal panels 441, the incident-side polarization plates 442, the irradiation-side polarization plates 443 and the cross dichroic prism 444 are integrally formed, a main tank 445 that operates as cooling fluid accumulating section, a radiator 447 that operates as heat emitting section (FIGS. 2 and 3), a plurality of fluid circulating members 448 and a pair of fluid circulating member link sections 446 (FIG. 3).

The plurality of fluid circulating members 448 are formed by pipe-shaped members that are made of aluminum and adapted to allow convection of heat to take place in the cooling fluid in the inside and connect the members 440, 445, 447 to allow cooling fluid to circulate. Heat generated by the liquid crystal panels 441, the incident-side polarization plates 442 and the irradiation-side polarization plates 443 of the optical device main body 440 is absorbed by the circulating cooling fluid.

Ethylene glycol that is transparent non-volatile liquid is used as cooling fluid in this embodiment. However, cooling fluid is not limited to ethylene glycol and any other appropriate liquid may alternatively be used as cooling fluid for the purpose of the present invention.

Now, the members 440, 445, 447 will be described sequentially in the order of arrangement as viewed from the upstream side of the flow path of the circulating cooling fluid relative to the liquid crystal panels 441. The structure of the fluid circulating member link sections 446 will be described thereafter.

[Structure of the Main Tank]

Figure 5A:
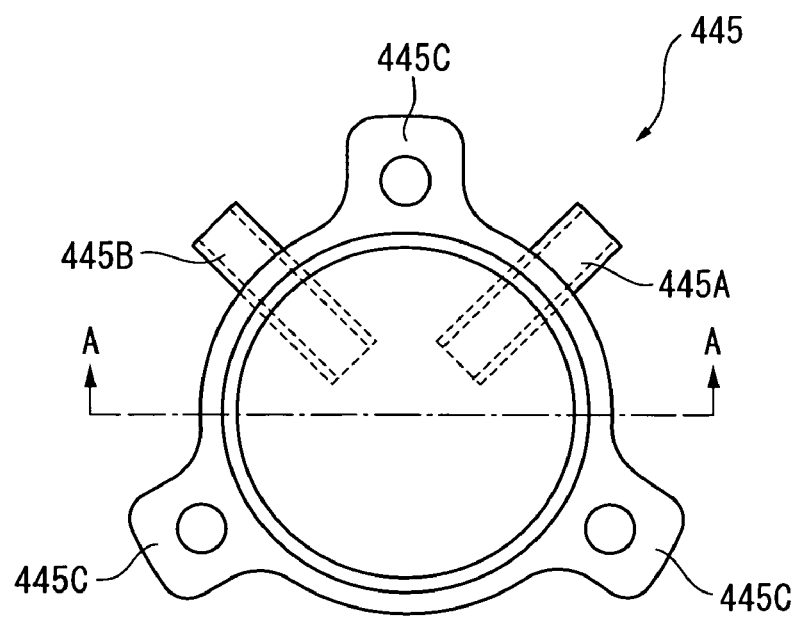
FIG. 5A is a plan view of a main tank of the aforementioned embodiment, showing the structure thereof.
Figure 5B:
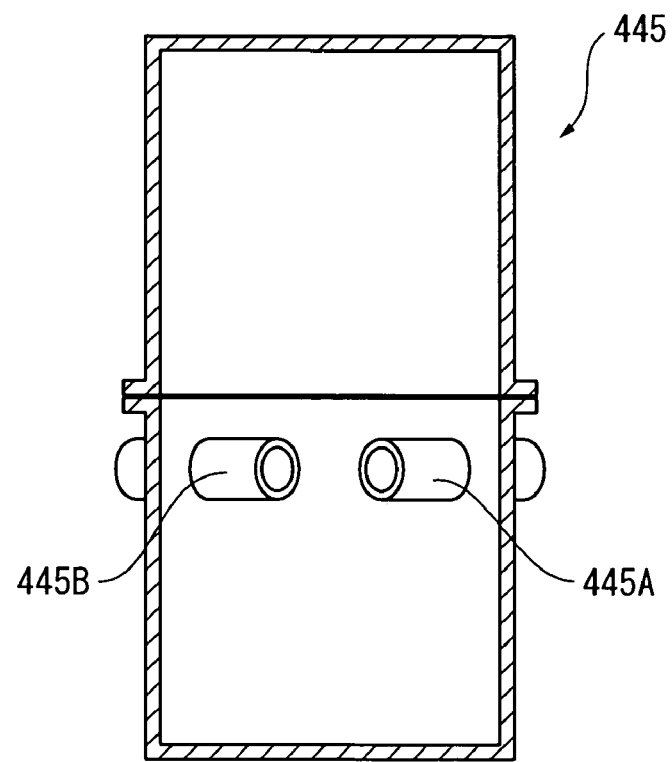
FIG. 5B is a cross sectional view taken along line A—A in FIG. 5A.

FIGS. 5A and 5B schematically illustrate the structure of the main tank 445. More specifically, FIG. 5A is a plan view of a main tank 445 seen from above. FIG. 5B is a cross sectional view taken along line A—A in FIG. 5A.

The main tank 445 shows a substantially cylindrical profile and are formed by a pair of container-shaped members that are made of aluminum and connected to each other at the apertures thereof to temporarily store cooling fluid in the in side. The container-shaped members are connected to each other by seal-welding or with a resilient member typically made of rubber and interposed between them.

As shown in FIG. 5B, the main tank 445 is provided at a substantially middle part as viewed in the axial direction thereof with a cooling fluid flow-in section 445A for flowing cooling fluid to the inside and a cooling fluid flow-out section 445B for flowing cooling fluid to the outside.

The cooling fluid flow-in section 445A and the cooling fluid flow-out section 445B are formed by using substantially hollow cylindrical members having a diameter smaller than that of the fluid circulating members 448 and arranged so as to project both to the outside and to the inside of the main tank 445. The cooling fluid flow-in section 445A is connected at the end thereof projecting to the outside to an end of the corresponding one of the fluid circulating members 448 so that cooling fluid flows into the main tank 445 by way of the fluid circulating members 448. Similarly, the cooling fluid flow-out section 445B is connected at the end thereof projecting to the outside to an end of the corresponding one of the fluid circulating members 448 so that cooling fluid flows out from the inside of the main tank 445 via the fluid circulating members 448.

As shown in FIG. 5A, the other end of the cooling fluid flow-in section 445A and that of the cooling fluid flow-out section 445B extend toward the axis of the main tank 445 in the inside of the latter. The cooling fluid flow-in section 445A and the cooling fluid flow-out section 445B are arranged so as to be perpendicular relative to each other as viewed from above. With this arrangement, it is possible to prevent the cooling fluid that flows into the inside of the main tank 445 via the cooling fluid flow-in section 445A from immediately flowing out to the outside of the main tank 445 via the cooling fluid flow-out section 445B so that the cooling fluid that flows in is mixed with the cooling fluid remaining in the inside of the main tank 445 to keep the cooling fluid show a uniform temperature level.

Additionally, as shown in FIG. 5A, each of the container-shaped members of the main tank 445 is provided at a substantially middle part of the main tank 445 as viewed in the axial direction thereof with three fixing sections 445C. Thus, the container-shaped members are tightly connected to each other and the main tank 445 is rigidly anchored to the exterior case 2 as screws 445D are driven to pass through the respective fixing sections 445C (FIGS. 2 through 4) and become engaged with the bottom wall of the exterior case 2.

As seen from FIG. 1 or 2, the main tank 445 is arranged in the substantially triangular region defined by the optical component casing 45 and an inner lateral surface of the exterior case 2. As the main tank 445 is arranged in this region, the exterior case 2 efficiently contains the related components to make it possible to realize a compact projector 1.

[Configuration of the Optical Device Main Body]

As seen from FIG. 3 or 4, the optical device main body 440 has a pressurized fluid feeding section 4400, a fluid branching section 4401 (FIG. 4), three optical modulator holders 4402 and a relay tank 4403 that operates as cooling fluid relay section in addition to the three liquid crystal panels 441, three incident-side polarization plates 442, three irradiation-side polarization plates 443 and the cross dichroic prism 444.

[Structure of Pressurized Fluid Feeding Section]

The pressurized fluid feeding section 4400 feeds in cooling fluid accumulated in the main tank 445 and forcibly feeds out the fed-in cooling fluid to the outside. For this purpose, the pressurized fluid feeding section 4400 is connected to and communicates with the other end of the fluid circulating member 448 connected to the cooling fluid flow-out section 445B, while it is connected to and communicates with an end of the other corresponding fluid circulating member 448 in order to feed out cooling fluid to the outside as seen from FIG. 3 or 4.

Although not illustrated specifically, the pressurized fluid feeding section 4400 is for example, formed by a substantially cubic hollow member made of aluminum, in which an impeller is arranged. Thus, the pressurized fluid feeding section 4400 forcibly feeds in cooling fluid accumulated in the main tank 445 via the related fluid circulating members 448 and feeds out the fed-in cooling fluid to the outside by way of the related fluid circulating members 448. With this arrangement, it is possible to reduce the height of pressurized fluid feeding section 4400 as viewed along the rotary axis of the impeller so that the pressurized fluid feeding section 4400 can be arranged in a free space in the inside of the projector 1. In this embodiment, the pressurized fluid feeding section 4400 is arranged downstream relative to the projection lens 5 as shown in FIG. 2.

[Structure of the Fluid Branching Section]

Figure 6:
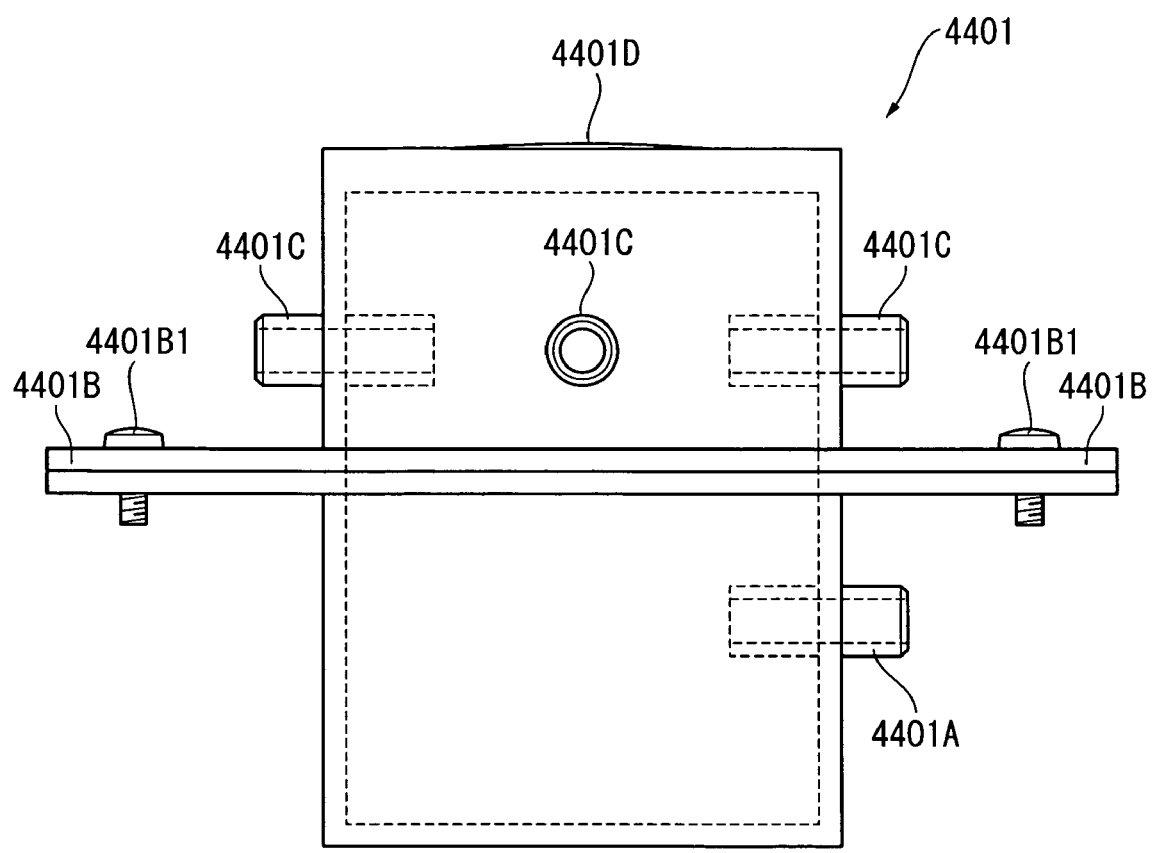
FIG. 6 is an illustration of a fluid branching section of the aforementioned embodiment.

FIG. 6 shows the structure of the fluid branching section. More specifically, FIG. 6 is a view taken from the green light incident side of the fluid branching section 4401.

The fluid branching section 4401 shows a profile like that of a quadrangular prism and is formed by using two container-shaped members made of aluminum. As the two container-shaped members are connected to each other at the apertures thereof, it is made to be able to contain cooling fluid in a hermetically sealed state. It is adapted to feed in the cooling fluid that is forcibly fed out from the pressurized fluid feeding section 4400 and feed out the fed-in cooling fluid, branching it for the three optical modulator holders 4402. The fluid branching section 4401 is rigidly secured to the bottom surface of the cross dichroic prism 444 that is the end facet that intersects the three light beam incident side end facets of the cross dichroic prism 444 so that it also operates as prism fixing plate for supporting the cross dichroic prism 444.

As seen from FIG. 4 or 6, the fluid branching section 4401 is provided at the lateral side for receiving blue light of the lower container-shaped member thereof with a cooling fluid flow-in section 4401A for allowing pressurized cooling fluid fed out from the pressurized fluid feeding section 4400 to flow into the inside thereof. The cooling fluid flow-in section 4401A is formed by using a substantially hollow cylindrical member having a diameter smaller than that of the fluid circulating members 448 as in the case of the cooling fluid flow-in section 445A of the main tank 445 and arranged so as to project both to the inside and the outside of the fluid branching section 4401. The cooling fluid flow-in section 4401A is connected at the end projecting to the outside to the other end of the corresponding fluid circulating member 448 that is connected to and communicates with the pressurized fluid feeding section 4400 so that pressurized fluid fed from the pressurized fluid feeding section 4400 by way of the fluid circulating member 448 flows into the inside of the fluid branching section 4401.

As seen from FIG. 4 or 6, the fluid branching section 4401 is provided substantially at the middle of the axial direction of the outer lateral sides of the quadrangular prism of the fluid branching section 4401 with a fixing section 4401B that extends perpendicularly from the outer lateral surfaces. Thus, the optical device main body 440 is rigidly secured to the component containing member 451 as screws 4401B1 are driven to pass through the fixing section 4401B and become engaged with the component containing member 451 of the optical component casing 45. At this time, the fluid branching section 4401 and the optical component casing 45 are connected to each other so as to be able to transmit heat. As the fluid branching section 4401 is connected to the optical component casing 45 so as to be able to transmit heat in this way, a heat transmission path is secured from the circulating cooling fluid to the optical component casing 45 through the fluid branching section 4401 to improve the cooling efficiency of cooling fluid and also the efficiency of cooling the liquid crystal panels 441, the incident-side polarization plates 442 and the irradiation-side polarization plates 443 by means of cooling fluid.

Additionally, as seen from FIG. 4 or 6, the upper container-shaped member of the fluid branching section 4401 is provided on the three lateral surfaces thereof that correspond to the light beam incident side end facets of the cross dichroic prism 444 respectively with three cooling fluid flow-out sections 4401C for allowing the fed in cooling fluid to be branched and flown to the three corresponding optical modulator holders 4402.

Like the cooling fluid flow-in section 4401A, each of the cooling fluid flow-out sections 4401C is formed by using a substantially hollow cylindrical member having a diameter smaller than that of the fluid circulating members 448 and arranged so as to project both to the inside and the outside of the fluid branching section 4401. Each of the cooling fluid flow-out sections 4401C is connected at the end projecting to the outside to an end of the corresponding fluid circulating member 448 so that fluid fed in the inside of the fluid branching section 4401 is branched and flown to the outside via the fluid circulating member 448.

Additionally, as shown in FIG. 6, the fluid branching section 4401 is provided substantially at the center of the top surface thereof with a spherical bulged section 4401D. The bottom surface of the cross dichroic prism 444 is held in contact with the bulged section 4401D to allow the position of the cross dichroic prism 444 to be adjusted relative to the fluid branching section 4401 in the moving direction thereof.

[Structure of the Optical Modulator Holders]

The three optical modulator holders 4402 hold the three liquid crystal panels 441, the three incident-side polarization plates 442 and the three irradiation-side polarization plates 443 and allow cooling fluid to flow into and flow out from the inside thereof so as to cool the three liquid crystal panels 441, the three incident-side polarization plates 442 and the three irradiation-side polarization plates 443. Since the three optical modulator holders 4402 are identical in terms of configuration, only one of the optical modulator holders 4402 will be described below. As seen from FIG. 3 or 4, the optical modulator holder 4402 includes an optical modulator holder main body 4404 and a support member 4405.

Figure 7:
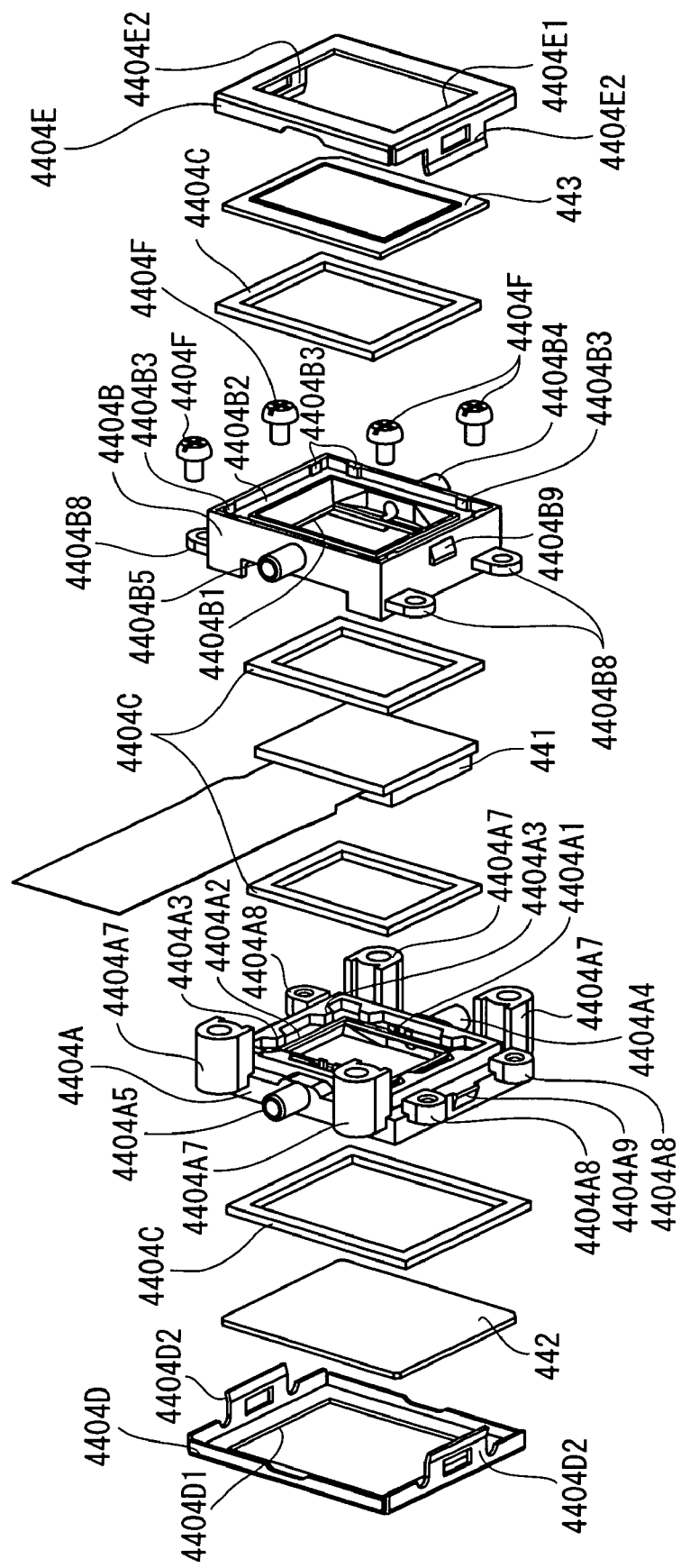
FIG. 7 is an exploded perspective view of the main body of an optical modulator holder of the aforementioned embodiment.

FIG. 7 is an exploded perspective view of the optical modulator holder main body 4404, showing its configuration.

As shown in FIG. 7, the optical modulator holder main body 4404 includes a pair of frame-shaped members 4404A, 4404B, four resilient members 4404C and two pairs of polarizing plate fixing members 4404D, 4404E.

The frame-shaped member 4404A is made of aluminum and has a substantially rectangular profile as viewed from above with a rectangular aperture 4404A1 arranged substantially at the center thereof so as to correspond to the image forming region of the corresponding liquid crystal panel 441. It is arranged at the light beam incident side relative to the other frame-shaped member 4404B and supports the light beam incident side end facet of the liquid crystal panel 441 and also the light beam emitting side end facet of the corresponding incident-side polarization plate 442.

Figure 8:
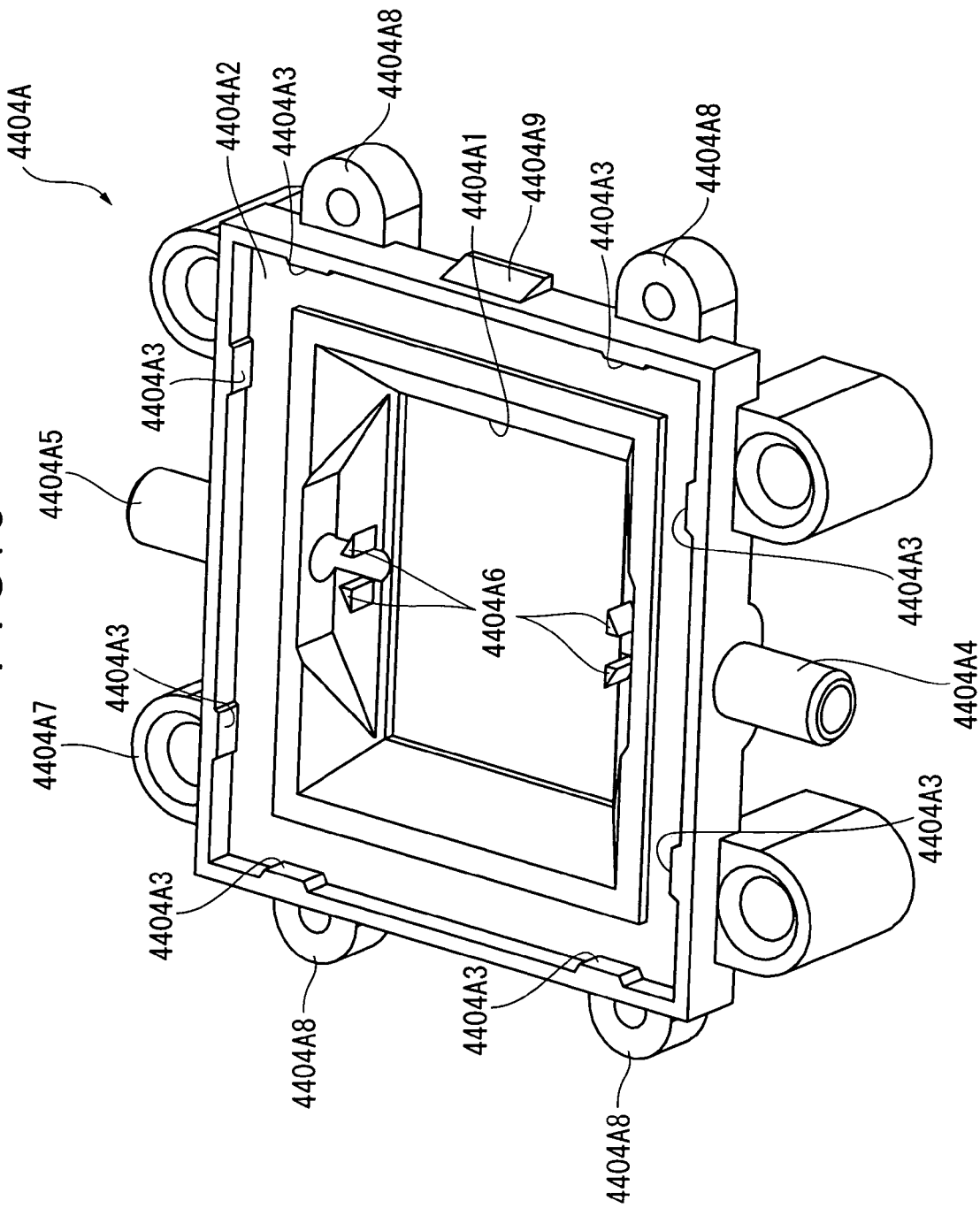
FIG. 8 is a perspective view of a frame-shaped member of the aforementioned embodiment as viewed from the light beam incident side thereof.

FIG. 8 is a schematic perspective view of a frame-shaped member 4404A as viewed from the light beam incident side thereof.

As shown in FIG. 8, the frame-shaped member 4404A is provided at the light beam incident side end facet thereof with a rectangular frame-shaped recess 4404A2 showing a contour corresponding to that of the resilient members 4404C so that it supports the corresponding incident-side polarization plate 442 in the recess 4404A2 via the resilient member 4404C. As the frame-shaped member 4404A supports the light beam emitting side end facet of the incident-side polarization plate 442, the aperture 4404A1 is closed at the light beam incident side thereof by the resilient member 4404C and the light beam emitting side end facet of the incident-side polarization plate 442. Additionally, the recess 4404A2 is provided on the peripheral surface thereof with a plurality of engaging projections 4404A3 and the resilient member 4404C is placed in position in the recess 4404A2 as the outer peripheral surface of the resilient member 4404C abuts the engaging projections 4404A3.

The frame-shaped member 4404A is also provided at the light beam emitting side end facet thereof with a rectangular frame-shaped recess 4404A2 showing a contour corresponding to that of the resilient member 4404C as at the light beam incident side end facet so that it supports the light beam incident side end facet of the corresponding liquid crystal panel 441 in the recess via the resilient member 4404C. As the frame-shaped member 4404A supports the light beam incident side end facet of the liquid crystal panel 441, the aperture 4404A1 is closed at the light beam emitting side thereof by the resilient member 4404C and the light beam incident side end facet of the liquid crystal panel 441. The recess 4404A2 is provided on the peripheral surface thereof also with a plurality of engaging projections 4404A3 at the light beam emitting side end facet.

Thus, a cooling chamber R1 (see FIG. 11) is formed in the inside of the frame-shaped member 4404A as the aperture 4404A1 is closed by the liquid crystal panel 441 and the incident-side polarization plate 442 respectively at the light beam incident side and the light beam emitting side. The cooling chamber R1 can be hermetically sealed with cooling fluid contained therein.

Additionally, as shown in FIG. 8, the frame-shaped member 4404A is provided substantially at the middle of the lower end thereof with a flow-in port 4404A4 that allows cooling fluid flowing out from the cooling fluid flow-out section 4401C of the fluid branching section 4401 to flow into the inside thereof. The flow-in port 4404A4 is formed by a substantially hollow cylindrical member having a diameter smaller than that of the fluid circulating members 448 and projects to the outside of the frame-shaped member 4404A. The projecting end of the flow-in port 4404A4 is connected to the other end of the corresponding fluid circulating member 448 that is connected to the cooling fluid flow-out section 4401C of the fluid branching section 4401 so that cooling fluid flowing out from the fluid branching section 4401 via the fluid circulating member 448 flows into the cooling chamber R1 of the frame-shaped member 4404A (see FIG. 11).

Still additionally, as shown in FIG. 8, the frame-shaped member 4404A is provided substantially at the middle of the upper end thereof with a flow-out port 4404A5 that allows cooling fluid flowing out from the inside of the cooling chamber R1 (see FIG. 11) of the frame-shaped member 4404A to the outside. More specifically, the flow-out port 4404A5 is arranged at a position vis-à-vis the flow-in port 4404A4. Like the flow-in port 4404A, the flow-out port 4404A5 is formed by a substantially hollow cylindrical member having a diameter smaller than that of the fluid circulating members 448 and projects to the outside of the frame-shaped member 4404A. The projecting end of the flow-in port 4404A5 is connected to the corresponding fluid circulating member 448 so that cooling fluid flows out from the cooling chamber R1 (see FIG. 11) to the outside via the fluid circulating member 448.

Then, as shown in FIG. 8, recesses are formed and directed toward the light beam emitting side from the peripheral edge of the aperture 4404A1 respectively near the site communicating to the flow-in port 4404A4 and near the site communicating to the flow-out port 4404A5. The recesses are tapered toward the respective sites to form the lateral surfaces thereof.

Two flow rectifying sections 4404A6 are formed so as to stand from the bottom of each of the recesses. The flow rectifying sections 4404A6 show a substantially rectangularly triangular cross section and arranged with a predetermined gap separating them from each other in such a way that the oblique sides of the rectangular triangles spread so as to move away from the corresponding site.

As shown in FIG. 8, four insertion sections 4404A7 are formed on the upper lateral side and the lower lateral side of the frame-shaped member 4404A at respective positions near the corners of the member 4404A so as to receive the respective pin-shaped members of the support member 4405, which will be described hereinafter.

Additionally, as shown in FIG. 8, four connecting sections 4404A8 are formed on the lateral sides of the frame-shaped member 4404A at respective positions near the corners of the frame-shaped member 4404A so as to be connected to the frame-shaped member 4404B.

Still additionally, as shown in FIG. 8, a hook 4404A9 is formed at the middle of each of the lateral sides of the frame-shaped member 4404A so as to be engaged with the polarizing plate fixing members 4404D.

The frame-shaped member 4404B is an aluminum-made member and adapted to pinch the corresponding liquid crystal panel 441 between itself and the frame-shaped member 4404A via resilient members 4404C and support the corresponding irradiation-side polarization plate 443 on the surface thereof opposite to the surface facing the frame-shaped member 4404A via a resilient member 4404C. The frame-shaped member 4404B has a structure substantially the same as the above-described frame-shaped member 4404A. More specifically, the frame-shaped member 4404B is provided with an aperture 4404B1, a recess 4404B2, a plurality of engaging projections 4404B3, a flow-in port 4404B4, a flow-out port 4404B5, flow rectifying sections (not shown), connecting section 4404B8 and hooks 4404B9 similar to the aperture 4404A1, the recess 4404A2, the plurality of engaging projections 4404A3, the flow-in port 4404A4, the flow-out port 4404A5, the flow rectifying sections 4404A6, the connecting section 4404A8 and the hooks 4404A9 of the frame-shaped member 4404A.

As shown in FIG. 4, the other end of each of the fluid circulating members 448 for connecting fluid the cooling fluid flow-out sections 4401C of the fluid branching section 4401 and the flow-in ports 4404A4, 4404B4 of the frame-shaped members 4404A, 4404B has a biforked profile. More specifically, the cooling fluid flowing out from each of the cooling fluid flow-out sections 4401C of the fluid branching section 4401 is divided into two parts via the fluid circulating members 448 and made to flow into the respective cooling chambers R1, R2 of the corresponding frame-shaped members 4404A, 4404B (see FIG. 11).

Each of the liquid crystal panels 441 is pinched between the corresponding frame-shaped members 4404A, 4404B via resilient members 4404C as screws 4404F are driven into the connecting sections 4404A8, 4404B8 of the frame-shaped members 4404A, 4404B so that the apertures 4404A1, 4404B1 of the frame-shaped members 4404A, 4404B are closed and the frame-shaped members 4404A, 4404B are hermetically sealed.

The resilient members 4404C are arranged between the incident-side polarization plate 442 and the frame-shaped member 4404A, between the frame-shaped member 4404A and the liquid crystal panel 441, between the liquid crystal panel 441 and the frame-shaped member 4404B and between the frame-shaped member 4404B and the irradiation-side polarization plate 443 to hermetically seal the cooling chambers R1, R2 of the frame-shaped members 4404A, 4404B (see FIG. 11) and prevent cooling fluid from leaking. The resilient members 4404C are made of elastic silicon rubber and subjected to a surface treatment at the both surfaces or at one of the surfaces to raise the cross-linking density of the surface layer. For example, any of Sarcon GR-d Series (tradename, available from FujiPoly Co. Ltd.) may be used to form the resilient members 4404C. As resilient members 4404C are surface treated at both or one of the surfaces thereof, the operation of arranging the resilient members 4404C into the respective recesses 4404A2, 4404B2 of the frame-shaped members 4404A, 4404B can be conducted with ease.

Alternatively, the resilient members 4404C may be made of butyl rubber or fluorocarbon rubber that moisture can hardly permeate.

The polarizing plate fixing members 4404D, 4404E are adapted to respectively press the incident-side polarization plate 442 and the irradiation-side polarization plate 443 against the recesses 4404A2, 4404B2 of the frame-shaped members 4404A, 4404B via the resilient members 4404C and rigidly secure them there. The polarizing plate fixing members 4404D, 4404E are substantially rectangular frame bodies in plan view that are provided at the centers thereof respectively with apertures 4404D1, 4404E1 so that they respectively press the incident-side polarization plate 442 and the irradiation-side polarization plate 443 against the frame-shaped members 4404A, 4404B at the peripheral parts of the apertures 4404D1, 4404E1 The polarizing plate fixing members 4404D, 4404E are provided at the lateral edges thereof respectively with hook engaging sections 4404D2, 4404E2. Thus, as the hook engaging section 4404D2, 4404E2 are engaged respectively with the hooks 4404A9, 4404B9 of the frame-shaped members 4404A, 4404B, the polarizing plate fixing members 4404D, 4404E are rigidly and respectively secured to the frame-shaped members 4404A, 4404B, while respectively pressing the incident-side polarization plate 442 and the irradiation-side polarization plate 443.

The support member 4405 is a frame-shaped plate member showing a rectangular contour in plan view and having an aperture (not shown) formed substantially at the center thereof.

The support member 4405 is provided at the light beam incident side thereof with pin-shaped members 4405A (see FIG. 11) projecting from the plate member at positions corresponding to the four insertion sections 4404A7 of the optical modulator holder main body 4404.

The support member 4405 supports the optical modulator holder main body 4404 as the pin-shaped members 4405A (see FIG. 11) are respectively driven to pass through the four insertion sections 4404A7 of the optical modulator holder main body 4404 and the optical modulator holder main body 4404 is made integral with the cross dichroic prism 444 as the light beam emitting side of the plate member is bonded to the light beam incident side of the cross dichroic prism 444.

[Structure of the Relay Tank]

Figure 9A:
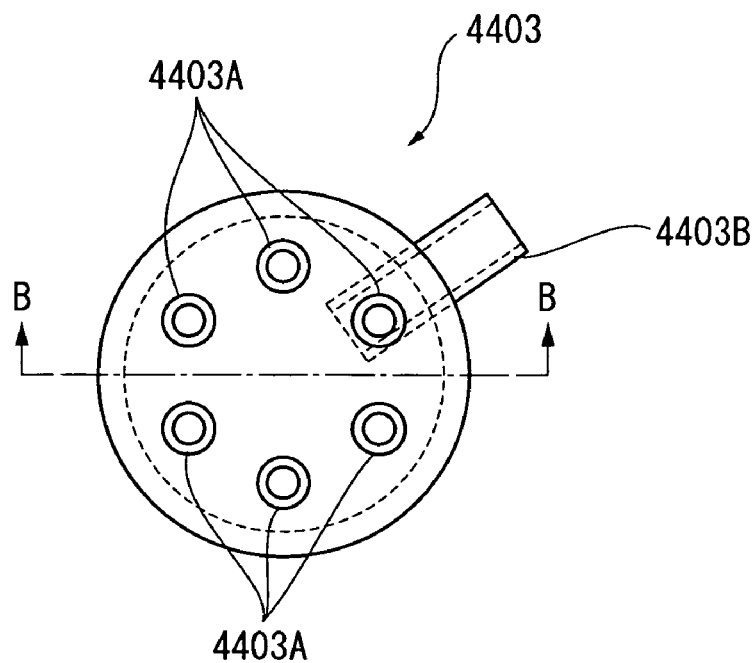
FIG. 9A is a plan view of a relay tank of the aforementioned embodiment, showing the structure thereof.
Figure 9B:
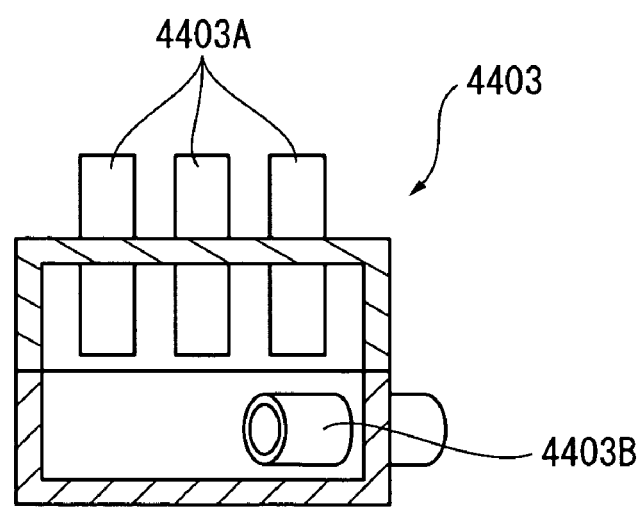
FIG. 9B is a cross sectional view taken along line B—B in FIG. 9A.

FIGS. 9A and 9B schematically illustrate the structure of the relay tank 4403. More specifically, FIG. 9A is a plan view of the relay tank 4403 seen from above. FIG. 9B is a cross sectional view taken along line B—B in FIG. 9A.

The relay tank 4403 is a substantially cylindrical hollow member made of aluminum that is rigidly secured to the top facet of the cross dichroic prism 444 that intersects the three light beam receiving end facets of the cross dichroic prism 444. The relay tank 4403 collectively feeds in the cooling fluid that is fed out from the optical modulator holders 4402 and feeds out the cooling fluid that is fed into it.

The relay tank 4403 is provided at the top surface thereof with six cooling fluid flow-in sections 4403A for allowing the cooling fluid fed out from the frame-shaped members 4404A, 4404B of the optical modulator holders 4402 to flow in as shown in FIGS. 9A and 9B. Each of the cooling fluid flow-in sections 4403A is formed by using a substantially cylindrical hollow member having a diameter smaller than that of the fluid circulating members 448 and arranged so as to project both to the outside and to the inside of the relay tank 4403. The ends of the cooling fluid flow-in sections 4403A projecting to the outside are respectively connected to the other ends of the corresponding fluid circulating members 448 connected to the flow-out ports 4404A5, 4404B5 of the frame-shaped members 4404A, 4404B of the three optical modulator holders 4402 so that the cooling fluid fed out from the optical modulator holders 4402 collectively flows into the relay tank 4403 via the fluid circulating members 448.

As shown in FIGS. 9A and 9B, the relay tank 4403 is provided at the lower end of the outer peripheral surface thereof with a cooling fluid flow-out section 4403B for flowing out the cooling fluid that is fed in to the outside. Like the cooling fluid flow-in sections 4403A, the cooling fluid flow-out section 4403B is formed by using a substantially cylindrical hollow member having a diameter smaller than that of the fluid circulating members 448 and arranged so as to project both to the outside and to the inside of the relay tank 4403. The end of the cooling fluid flow-out section 4403B projecting to the outside is connected to an end of the corresponding fluid circulating member 448 so that cooling fluid flows out from the inside of the relay tank 4403 to the outside via the fluid circulating member 448.

[Structure of the Radiator]

Figure 10A:
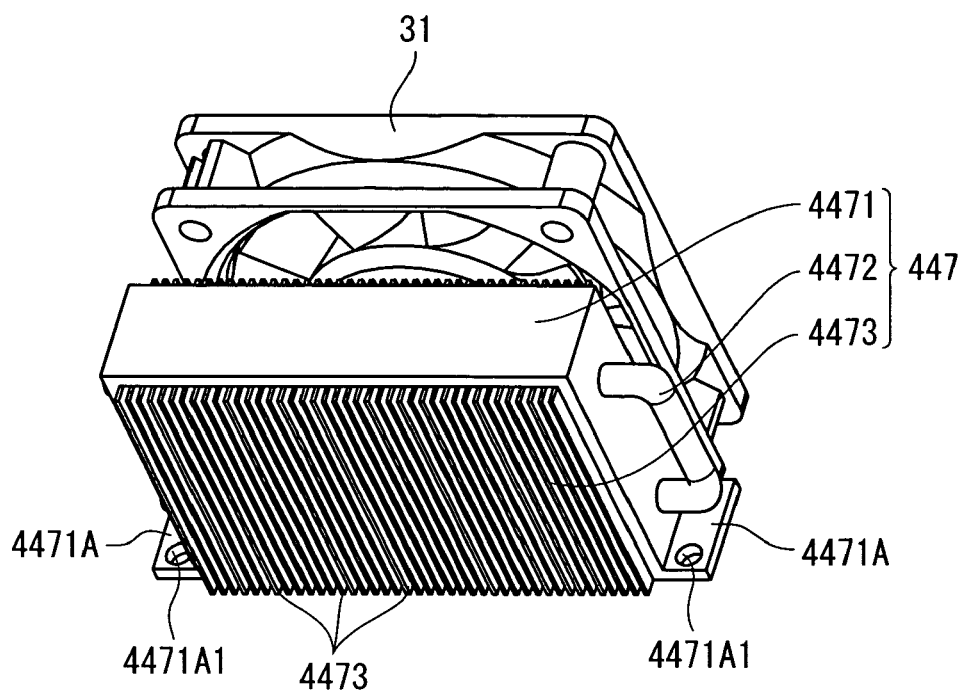
FIG. 10A is a perspective view of a radiator of the aforementioned embodiment, showing the structure of the radiator and the positional relationship between the radiator and an axial-flow fan related to the radiator.
Figure 10B:
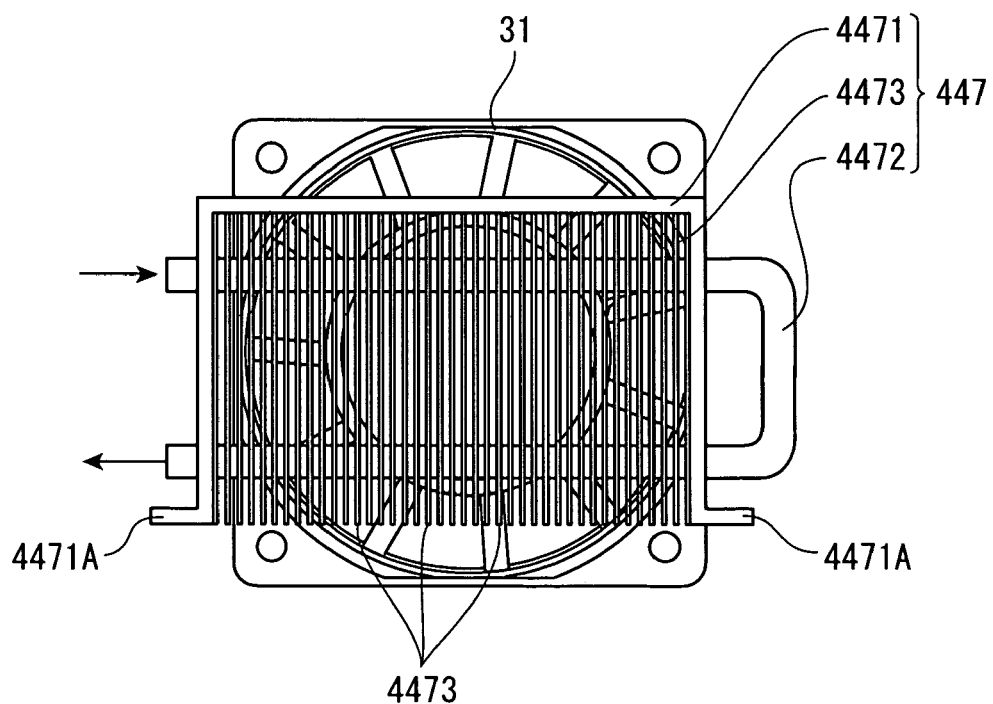
FIG. 10B is a plan view of the radiator and the axial-flow fan of the aforementioned embodiment as viewed from the side of the radiator.

FIGS. 10A and 10B schematically illustrate the structure of the radiator 447 and the positional relationship between the radiator 447 and the axial-flow fan 31. More specifically, FIG. 10A is a perspective view of the radiator 447 and the axial-flow fan 31 seen from above. FIG. 10B is a plan view of the radiator 447 and the axial-flow fan 31 as viewed from the side of the radiator 447.

As shown in FIG. 1 or 2, the radiator 447 is arranged in the partition wall 21 formed at the exterior case 2 and emits heat from the cooling fluid that is warmed by the liquid crystal panels 441, the incident-side polarization plates 442 and the irradiation-side polarization plates 443 of the optical device main body 440. As shown in FIGS. 10A and 10B, the radiator 447 has an fixing section 4471, a pipe-shaped member 4472 and a plurality of fins 4473.

The fixing section 4471 is a thermally conductive member typically made of metal and, as shown in FIG. 10B, has a substantially U-shaped profile in plan view. The pipe-shaped member 4472 is made to pass through the opposite sides of the U-shaped profile. Additionally, the fixing section 4471 supports the plurality of heat emitting fins 4473 between the opposite sides of the U-shaped profile. Outwardly extended sections 4471A are formed respectively at the front ends of the opposite sides of the U-shaped profile of the fixing section 4471 so that the radiator 447 is rigidly secured to the exterior case 2 as screws (not shown) are driven through the respective holes 4471A1 of the extended sections 4471A into the exterior case 2.

The pipe-shaped member 4472 is made of aluminum and, as shown in FIG. 10B, extends from one of the opposite sides of the U-shaped profile of the fixing section 4471 to the other side and then turns downward by 90° and then sideways by 90° to return from the other side to the starting side of the U-shaped profile of the fixing section 4471 to make itself show a U-shaped profile. Thus, the pipe-shaped member 4472 is connected to the fixing section 4471 and the heat emitting fins 4473 so as to be able to transmit heat. The pipe-shaped member 4472 has a diameter smaller than that of the fluid circulating members 448 and its upper end shown in FIG. 10B is connected to the other end of the corresponding fluid circulating member 448 that is connected to the cooling fluid flow-out section 4403B of the relay tank 4403 of the optical device main body 440. On the other hand, the lower end of the pipe-shaped member 4472 shown in FIG. 10B is connected to the other end of the corresponding fluid circulating member 448 that is connected to the cooling fluid flow-in section 445A of the main tank 445. Thus, the cooling fluid that flows out from the relay tank 4403 passes through the pipe-shaped member 4472 via the corresponding fluid circulating member 448 and then flows into the main tank 445 via the corresponding fluid circulating member 448.

The heat emitting fins 4473 are typically thermally conductive plate members that are made of metal so as to allow the pipe-shaped member 4472 to pass through them. The plurality of heat emitting fins 4473 extend in a direction perpendicular to the running direction of the pipe-shaped member 4472 and are arranged in parallel with each other along the running direction of the pipe-shaped members 4472. With this arrangement of the plurality of heat emitting fins 4473, the cooling air ejected from the axial-flow fan 31 passes through the gaps separating the plurality of heat emitting fins 4473 as seen from FIGS. 10A and 10B.

As described above in detail, cooling fluid circulates through the flow path formed by the main tank 445—pressurized fluid feeding section 4400—fluid branching section 4401—optical modulator holders 4402—relay tank 4403—radiator 447—main tank 445, which are connected by a plurality of fluid circulating members 448.

[Cooling Structure]

Now, the cooling structure of the liquid crystal panels 441, the incident-side polarization plates 442 and the irradiation-side polarization plates 443 will be described below.

Figure 11:
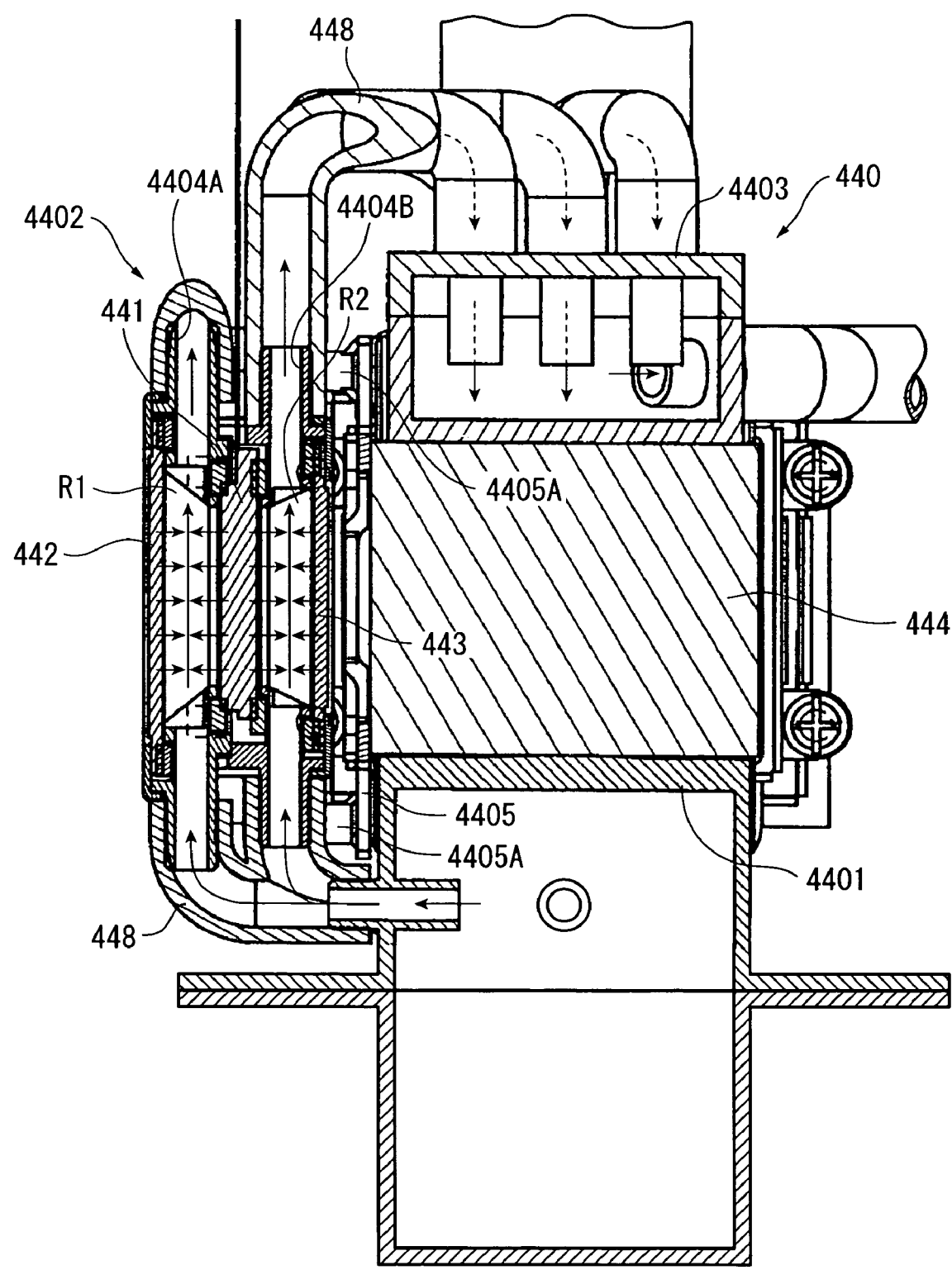
FIG. 11 is a cross sectional view of the aforementioned embodiment, showing the cooling structure of liquid crystal panels, incident-side polarization plates and irradiation-side polarization plates.

FIG. 11 is a schematic cross sectional view of the first embodiment, illustrating the cooling structure of the liquid crystal panels 441, the incident-side polarization plates 442 and the irradiation-side polarization plates 443.

The heat generated in the liquid crystal panels 441, the incident-side polarization plates 442 and the irradiation-side polarization plates 443 by the light beams emitted from the light source device 411 is transmitted to the cooling fluid contained in the cooling chambers R1, R2 of the frame-shaped members 4404A, 4404B of the optical modulator holders 4402.

The heat transmitted to the cooling fluid in the cooling chambers R1, R2 is then transferred from the cooling chambers R1, R2 to the relay tank 4403 and then further to the radiator 447 as the cooling fluid flows. As warmed cooling fluid passes through the pipe-shaped member 4472 of the radiator 447, the heat of the cooling fluid is transferred from the pipe-shaped member 4472 to the heat emitting fins 4473. Then, the warmed plurality of heat emitting fins 4473 are cooled by cooling air ejected from the axial-flow fan 31.

The cooling fluid cooled by the radiator 447 then flows through the flow path formed by the radiator 447—main tank 445—pressurized fluid feeding section 4400—fluid branching section 4401 and returns to the cooling chambers R1, R2.

[Structure of the Fluid Circulating Member Link Sections]

As shown in FIG. 3, the fluid circulating member 448 that connects the cooling fluid flow-out section 4403B of the relay tank 4403 and upper end of the pipe-shaped member 4472 in the radiator 447 includes two fluid circulating members 448A, 448B. Similarly, the fluid circulating member 448 that connects the pressurized fluid feeding section 4400 and the cooling fluid flow-out section 445B of the main tank 445 includes two fluid circulating members 448C, 448D.

As shown in FIG. 3, the two fluid circulating member link sections 446 respectively and serially link the fluid circulating members 448A and 448B and the fluid circulating members 448C and 448D so as to allow cooling fluid to flow through them.

Figure 12:
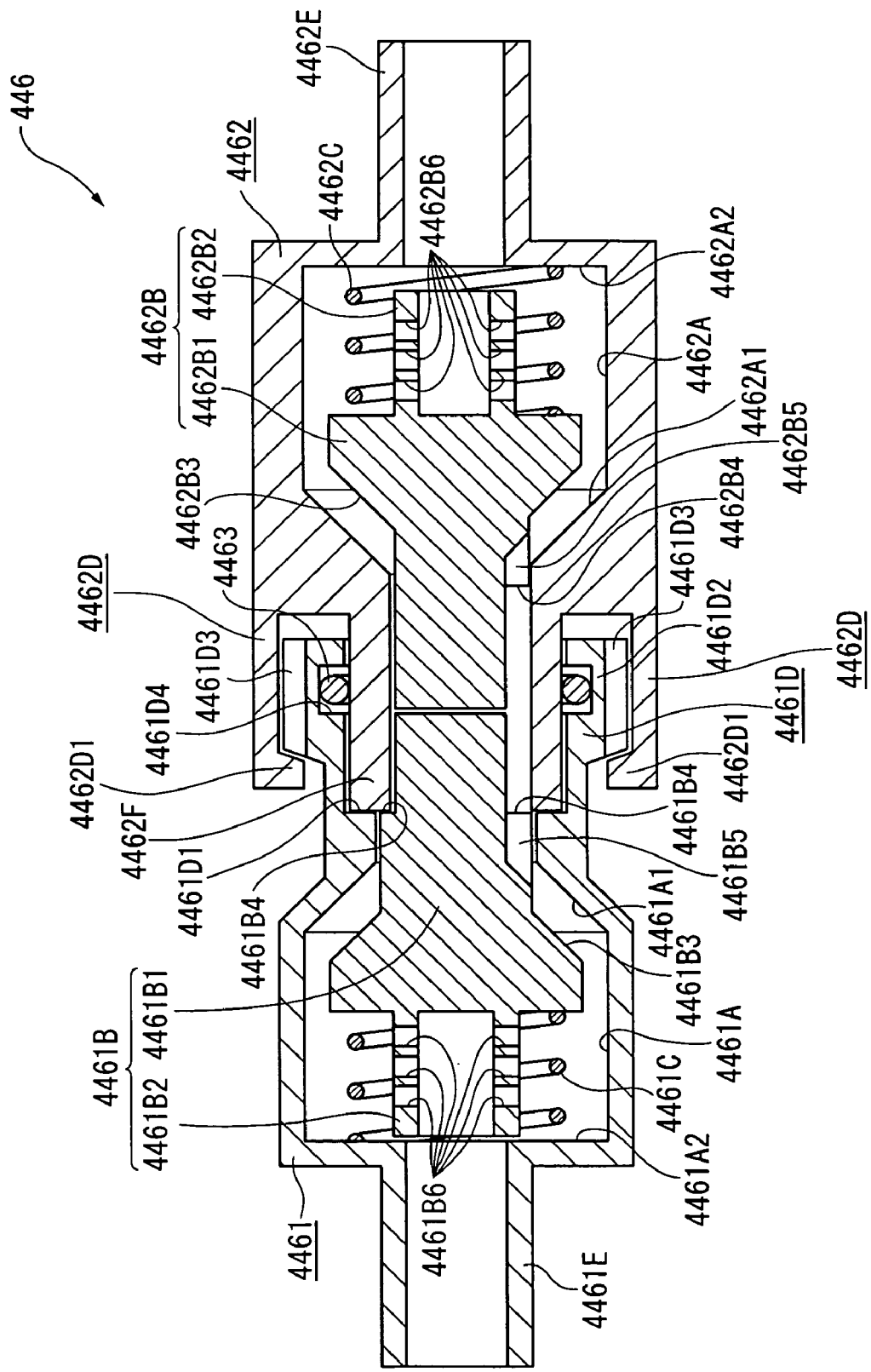
FIG. 12 is a cross sectional view of fluid circulating member link sections of the aforementioned embodiment.

FIG. 12 is a cross sectional view showing the structure of one of the fluid circulating member link sections 446.

Referring to FIG. 12, the fluid circulating member link section 446 is made of aluminum and includes a first link section 4461 and a second link section 4462 so that the fluid circulating members 448A and 448B or the fluid circulating members 448C and 448D are linked to each other to allow cooling fluid to flow through them as the first link section 4461 and the second link section 4462 are connected to each other.

As shown in FIG. 12, the first link section 4461 has a substantially hollow cylindrical profile to allow cooling fluid to pass through it. The first link section 4461 is formed by a cooling fluid flow bore 4461A, a first flow valve 4461B, a coil spring 4461C that is a flow valve urging section, a first engaging section 4461D and a fluid circulating member fitting section 4461E.

The cooling fluid flow bore 4461A is a through bore running in the axial direction of the cylindrical first link section 4461 so as to allow cooling fluid to flow through it.

The cooling fluid flow bore 4461A has a tapered inner surface 4461A1 near the front end (right side in FIG. 12) thereof to gradually reduce the inner diameter of the bore toward the front end thereof and then it extends uniformly along the axis thereof from the front end of the tapered surface 4461A1.

Additionally, the cooling fluid flow bore 4461A has a stepped section 4461A2 having a reduced diameter at the base end (left side in FIG. 12) of the inner surface thereof.

The first flow valve 4461B is movably arranged in the cooling fluid flow bore 4461A to close the cooling fluid flow bore 4461A. As shown in FIG. 12, the first flow valve 4461B is formed by integrally combining a projection 4461B1 having a substantially round pillar-like profile in plan view and another projection 4461B2 having a substantially hollow cylindrical profile. The projections 4461B1, 4461B2 are movably arranged in the cooling fluid flow bore 4461A with their axes accurately aligned with the axis of the first link section 4461.

The projection 4461B1 is located at the front end side (right side in FIG. 12) of the first flow valve 4461B and has a diameter smaller than the inner diameter of the cooling fluid flow bore 4461A. The outer peripheral surface of the projection 4461B1 has a profile that corresponds to the profile of a front end part of the inner peripheral surface of the cooling fluid flow bore 4461A. In other words, it has a tapered surface 4461B3 that gradually reduces the diameter toward the front end (right side in FIG. 12) and then it extends uniformly along the axis thereof from the front end of the tapered surface 4461B3. The cooling fluid flow bore 4461A is closed as the tapered surface 4461B3 of the projection 4461B1 abuts the tapered surface 4461A1 of the cooling fluid flow bore 4461A, whereas the cooling fluid flow bore 4461A is opened as the tapered surface 4461B3 of the projection 4461B1 moves away from the tapered surface 4461A1 of the cooling fluid flow bore 4461A.

As shown in FIG. 12, the projection 4461B1 has a stepped section 4461B4 having a reduced diameter at the front end thereof. When the first link section 4461 and the second link section 4462 are connected to each other, the valve moving section of the second link section 4462, which will be described hereinafter, abuts the stepped section 4461B4 to move the first flow valve 4461B. The stepped section 4461B4 is provided at a part thereof with a plurality of grooves 4461B5 that are notched so as to be separated from the front end of the tapered surface 4461B3 by a predetermined distance and arranged in the peripheral direction of the stepped section 4461B4 (only a groove 4461B5 is shown in FIG. 12). When the cooling fluid flow bore 4461A is opened, cooling fluid flows through the grooves 4461B5.

When the front end of the projection 4461B1 is connected to the second link section 4462, it abuts the front end of the flow valve of the second link section 4462, which will be described hereinafter, and operates as valve moving section for moving the flow valve.

The projection 4461B2 is located at the base side (left side in FIG. 12) of the first flow valve 4461B and has a diameter smaller than that of the base end of the projection 4461B1.

As shown in FIG. 12, the projection 4461B2 is provided with a plurality of insertion holes 4461B6 that run from the outer peripheral surface thereof toward the axis of cylinder so that cooling fluid flows in the cooling fluid flow bore 4461A via the plurality of holes 4461B6.

The coil spring 4461C is arranged on the outer periphery of the projection 4461B2 of the first flow valve 4461B with its one end pressed against the stepped section 4461A2 of the cooling fluid through bore 4461A and its other end pressed against the base section of the projection 4461B1 of the first flow valve 4461B to urge the first flow valve 4461B in the direction of closing the cooling fluid flow bore 4461A. In other words, when the first link section 4461 and the second link section 4462 are not connected to each other, the first flow valve 4461B is urged by the coil spring 4461C to close the cooling fluid flow bore 4461A by the first flow valve 4461B.

The first engaging section 4461D is located at the front end of the first link section 4461 and has a substantially hollow cylindrical profile. The first link section 4461 and the second link section 4462 are connected to each other as the first engaging section 4461D is engaged with the second engaging sections of the second link section 4462, which will be described hereinafter. The first engaging section 4461D extends from the outer periphery of the front end of the outer wall of the cooling fluid flow bore 4461A along the outer wall. More specifically, a stepped section 4461D1 is formed at the inner periphery of the front end of the outer wall and the front end of the valve moving section of the second link section 4462, which will be described hereinafter, abuts the stepped section 4461D1 to define the position of the second link section 4462 relative to the first link section 4461 when the first link section 4461 and the second link section 4462 are connected to each other.

The first engaging section 4461D is provided at the front end thereof (right side in FIG. 12) with a bulged section 4461D2 having a thickness greater than the base part thereof (left side in FIG. 12). A plurality of grooves 4461D3 running in the axial direction of the bulged section 4461D2 are formed on the outer peripheral surface of the bulged section 4461D2 to extend toward the direction in which the first link section 4461 and the second link section 4462 are connected to each other (two grooves 4461D3 are shown in FIG. 12).

The bulged section 4461D2 is provided on the inner surface thereof with an O-ring receiving section 4461D4 for receiving an O-ring 4463 for preventing cooling fluid from leaking between the first link section 4461 and the second link section 4462 when these sections 4461, 4462 are connected to each other.

The fluid circulating member fitting section 4461E has a substantially hollow cylindrical profile and is connected to the stepped section 4461A2 of the cooling fluid flow bore 4461A so as to allow cooling fluid to flow into the cooling fluid flow bore 4461A. The fluid circulating member fitting section 4461E has a diameter smaller than that of the fluid circulating members 448 and is connected to the fluid circulating member 448A that is connected to the cooling fluid flow-out section 4403B of the relay tank 4403 or the fluid circulating member 448C that is connected to the pressurized fluid feeding section 4400.

While the first link section 4461 is connected to the fluid circulating member 448A or 448C in the above description, it may alternatively be connected to the fluid circulating member 448B or 448D.

Like the first link section 4461, the second link section 4462 has a substantially hollow cylindrical profile so as to allow cooling fluid to flow through the inside thereof and is adapted to be connected to the first link section 4461 with its axis substantially aligned with the axis of the first link section 4461. The second link section 4462 has a cooling fluid flow bore 4462A (including a tapered surface 4462A1 and a stepped section 4462A2), a second flow valve 4462B, a coil spring 4462C that operates as flow valve urging section and a fluid circulating member fitting section 4462E as well as second engaging sections 4462D and a valve moving section 4462F that are respectively similar to the cooling fluid flow bore 4461A (including a tapered surface 4461A1 and a stepped section 4461A2), the first flow valve 4461B, the coil spring 4461C and the fluid circulating member fitting section 4461E of the first link section 4461 described above.

Of the above listed components, the second flow valve 4462B has projections 4462B1, 4462B2, a tapered surface 4462B3, a stepped section 4462B4, a plurality of grooves 4462B5 (only a groove 4462B5 is shown in FIG. 12) and a plurality of holes 4462B6 that are respectively similar to the projections 4461B1, 4461B2, the tapered surface 4461B3, the stepped section 4461B4, the plurality of grooves 4461B5 (only a groove 4461B5 is shown in FIG. 12) and the plurality of holes 4461B6 of the first link section 4461.

The second engaging sections 4462D are located at the front end of the second link section 4462 and project along the outer peripheral edge of the second link section 4462. As a matter of fact, a number of second engaging sections 4462D are formed in the peripheral direction of the second link section 4462 so as to correspond to the plurality of grooves 4461D3 of the first engaging section 4461D (two engaging sections 4462D are shown in FIG. 12). The second engaging sections 4462D have an inner diameter slightly greater than the outer diameter of the bulged section 4461D2 of the first engaging section 4461D so that the first engaging section 4461D is located in the inside of the second engaging sections 4462D when the first link section 4461 and the second link section 4462 are connected to each other.

As shown in FIG. 12, each of the second engaging sections 4462D is provided at the front end thereof with a hook 4462D1 that projects toward the axis of cylinder. More specifically, the hook 4462D1 projects by a length that is substantially equal to the depth of the grooves 4461D3 of the first engaging section 4461D.

The valve moving section 4462F is an outer wall that extends in the axial direction from the front end of the tapered surface 4462A1 of the cooling fluid flow bore 4462A. When the first link section 4461 and the second link section 4462 are connected to each other, the front end of the valve moving section 4462F abuts the stepped section 4462B4 of the first flow valve 4461B of the first link section 4461 to move the first flow valve 4461B to open the cooling fluid flow bore 4461A of the first link section 4461. The outer diameter of the valve moving section 4462F is slightly smaller than the inner diameter of the first engaging section 4461D of the first link section 4461. When the first link section 4461 and the second link section 4462 are connected to each other, the O-ring 4463 is pressed between the outer peripheral surface of the valve moving section 4462F and the inner peripheral surface of the first engaging section 4461D so that the O-ring 4463 prevents cooling fluid from leaking through the gap between the first link section 4461 and the second link section 4462 that may otherwise be produced.

Now, the method of connecting the above-described first and second link sections 4461, 4462 will be described below. More specifically, a technique of linking the fluid circulating members 448A, 448B at the fluid circulating member link section 446 will be described below. The fluid circulating members 448C, 448D can be linked in a similar manner.

Firstly, the fluid circulating members 448A, 448B are connected respectively to the fluid circulating member fitting section 4461E of the first link section 4461 and the fluid circulating member fitting section 4462E of the second link section 4462.

Then, first link section 4461 and the second link section 4462 are placed to face each other and brought closer relative to each other while the grooves 4461D3 of the first engaging section 4461D of the first link section 4461 are held in alignment respectively with the corresponding hooks 4462D1 of the second engaging sections 4462D of the second link section 4462.

As the hooks 4462D1 are moved respectively along the corresponding grooves 4461D3, the valve moving section 4462F of the second link section 4462 is put into the inside of the first engaging section 4461D of the first link section 4461 until the front end of the valve moving section 4462F abuts the stepped section 4461B4 of the first flow valve 4461B.

As the first link section 4461 and the second link section 4462 are brought closer relative to each other, the valve moving section 4462F presses the stepped section 4461B4 of the first flow valve 4461B so that the first flow valve 4461B is driven to move against the urging force of the coil spring 4461C in the direction of opening the cooling fluid flow bore 4461A. The first flow valve 4461B is driven to move until the front end of the valve moving section 4462F abuts the stepped section 4461D1 of the first link section 4461 to consequently open the cooling fluid flow bore 4461A.

At this time, the front end of the first flow valve 4461B of the fist link section 4461 abuts the front end of the second flow valve 4462B of the second link section 4462 and, as the first link section 4461 and the second link section 4462 are brought closer relative to each other, the second flow valve 4462B is pressed by the first flow valve 4461B and driven to move in the direction of opening the cooling fluid flow bore 4462A of the second link section 4462 against the urging force of the coil spring 4462C. As a result, the cooling fluid flow bore 4462A is opened.

Then, as the first link section 4461 is turned around the axis of cylinder relative to the second link section 4462 or vice versa in this state (the state shown in FIG. 12), the hooks 4462D1 are engaged with the bulged section 4461D to firmly connect the first link section 4461 and the second link section 4462. In other words, a bayonet type connection structure is adopted to connect the first link section 4461 and the second link section 4462.

When the first link member 4461 and the second link member 4462 are connected to each other, the cooling fluid flow bores 4461A, 4462A are opened as described above so that cooling fluid can flow between the fluid circulating members 448A, 448B via the plurality of grooves 4461B5, 4462B5 of the first flow valve 4461B and the second flow valve 4462B.

The first link section 4461 and the second link section 4462 can be released from each other by reversely following the above-described technique. When the second link section 4462 is released from the first link section 4461, the first flow valve 4461B and the second flow valve 4462B are urged respectively by the coil springs 4461C, 4462C to close the cooling fluid flow bores 4461A, 4462A. Additionally, the closing effect of the tapered surfaces 4461A1, 4462A1 of the cooling fluid flow bores 4461A, 4462A is improved when the ends of the reduced diameter sides of the tapered surfaces 4461B3, 4462B3 of the first flow valve 4461B and the second flow valve 4462B are displaced respectively from the base points of the plurality of grooves 4461B5, 4462B5.

With the above-described arrangement, the optical device main body 440 can be removably fitted to the main tank 445 and the radiator 447 of the optical device 44 because the first link section 4461 and the second link section 4462 of each of the two fluid circulating member link sections 446 can be connected to and released from each other.

When the optical device 44 is incorporated into the exterior case 2 of the projector 1 of the above-described first embodiment, it is mounted in the exterior case 2 with the optical device main body 440 removed away from the main tank 445 and the radiator 447 and subsequently the optical device main body 440 is fitted to the main tank 445 and the radiator 447 by means of the two fluid circulating member link sections 446. Therefore, the optical device 44 can be handle with ease and the optical device main body 440 can be placed in position with ease at the right position relative to the optical axis of the light beam emitted from the light source device 411. In other words, liquid crystal panels 441 can be placed in position easily.

Thus, when an image is projected via the projection lens 5, no unnecessary light is projected on the screen so that the viewer can enjoy a high quality image.

Since the optical device main body 440 is formed by integrally combining the three liquid crystal panels 441, the three incident-side polarization plates 442, the three irradiation-side polarization plates 443, the cross dichroic prism 444, the pressurized fluid feeding section 4400, the fluid branching section 4401, the three optical modulator holders 4402 and the relay tank 4403, it is possible to efficiently lay out the components 4400 through 4403 and squeeze out the space for arranging the fluid circulating members 448 as a result of integrally forming the optical device main body 440 that contains three liquid crystal panels 441 so that the optical device 44 can be downsized and handled with ease.

Each of the pair of fluid circulating member link sections 446 is formed by a first link section 4461 and a second link section 4462. When connecting the first link section 4461 and the second link section 4462 to each other, the cooling fluid flow bores 4462A, 4461A are opened as the second flow valve 4462B and the first flow valve 4461B are driven to move respectively by means of the front end of the first flow valve 4461B and the valve moving section 4462F. Then, the first link section 4461 and the second link section 4462 are connected to each other as the first engaging section 4461D is engaged with the second engaging sections 4462D. The second link section 4462 can be released from the first link section 4461 by disengaging the first engaging section 4461D from the second engaging sections 4462D. Thus, the operation of linking the fluid circulating members 448A, 448B and that of linking the fluid circulating members 448C, 448D are reduced to one-touch operations to improve the efficiency of handling the optical device 44. Since each of the pair of fluid circulating members 448A, 448B and that of fluid circulating members 448C, 448D can be linked to each other by way of a one-touch operation, the external force applied for the linking operation is not transmitted to the optical device main body 440 so that the optical device main body 440 and hence the optical modulator holders 4402 can be excellently held in position.

Before connecting the first link section 4461 and the second link section 4462 to each other, the cooling fluid flow bores 4461A, 4462A are held to the closed positions respectively by the first flow valve 4461B and the second flow valve 4462B so that it is possible to connect the fluid circulating members 448A, 448B and the fluid circulating members 448C, 448D with the cooling fluid flow paths of the optical device 44 filled with cooling fluid in advance, or before actually connecting the fluid circulating members 448A, 448B and the fluid circulating members 448C, 448D to further improve the efficiency of handling the optical device 44. Additionally, as cooling fluid is filled in the optical modulator holders 4402 in advance, the focus adjusting operation of arranging the focal point of the projection lens 5 in line with the surfaces of the liquid crystal panels 441 can be conducted directly. If the focus adjusting operation is conducted without filling the optical modulator holders 4402 with cooling fluid, it is necessary to correct the reading of the adjusting instrument for the difference between the refractive index with cooling fluid and the refractive index without cooling fluid. Therefore, this embodiment does not require to correct the reading of the adjusting instrument and hence the adjusting operation can be conducted with an enhanced degree of precision.

When the second link section 4462 is released from the first link section 4461, the first flow valve 4461B and the second flow valve 4462B are driven to move respectively by the coil springs 4461C, 4462C and close the cooling fluid flow bores 4461A, 4462A. Therefore, cooling fluid does not leak to the outside if the second link section 4462 is removed from the first link section 4461 with the cooling fluid flow paths of the optical device 44 filled with cooling fluid. Thus, the optical device main body 440 can be fitted to and removed from the main tank 445 and the radiator 447 with the cooling fluid flow paths of the optical device 44 filled with cooling fluid to further improve the efficiency of handling the device 44. Additionally, the projector 1 is protected against stains, corrosion and short circuit accidents in the inside thereof that can otherwise take place when leakage of cooling fluid occurs to improve the reliability of the projector 1. Still additionally, when the optical device main body 440 is fitted to and removed from the main tank 445 and the radiator 447 with the cooling fluid flow paths of the optical device 44 filled with cooling fluid, the cooling fluid is not exposed to the atmosphere so that it is possible to prevent dust from entering the cooling fluid and hence the light beams passing through the cooling chambers R1, R2 would not be blocked by dust. Thus, the optical device main body 440 can maintain forming high quality images.

As the plurality of fluid circulating members 448, the main tank 445, the pressurized fluid feeding section 4400, the fluid branching section 4401, the pair of frame-shaped members 4404A, 4404B, the relay tank 4403, the pipe-shaped member 4472 and the pair of fluid circulating member link sections 446 are made of corrosion-resistant aluminum, they can prevent chemical reaction from taking place there if they are held in contact with cooling fluid for a long period of time. In short, the embodiment prevents cooling fluid from being colored and the optical characteristics of the light beams passing through the cooling chambers R1, R2 from being modified by reactive substances that can be produced as a result of chemical reactions.

2nd Embodiment

Now, the second embodiment of the present invention will be described by referring to the related drawings.

In the following description, the structures and the components same as or similar to those of the first embodiment will be denoted respectively by the same reference symbols and will be summarized or not be described any further.

In optical device 44 of the above-described first embodiment, the optical device main body 440 can be removably fitted to the main tank 445 and the radiator 447 by means of two fluid circulating member link sections 446.

On the other hand, in an optical device 54 of the second embodiment, the main tank 545 is fitted to the fluid branching section 5401 and integrated to an optical device main body 540. Then, the optical device main body 540 is removably fitted to the radiator 447 by means of the two fluid circulating member link sections 446.

Figure 13:
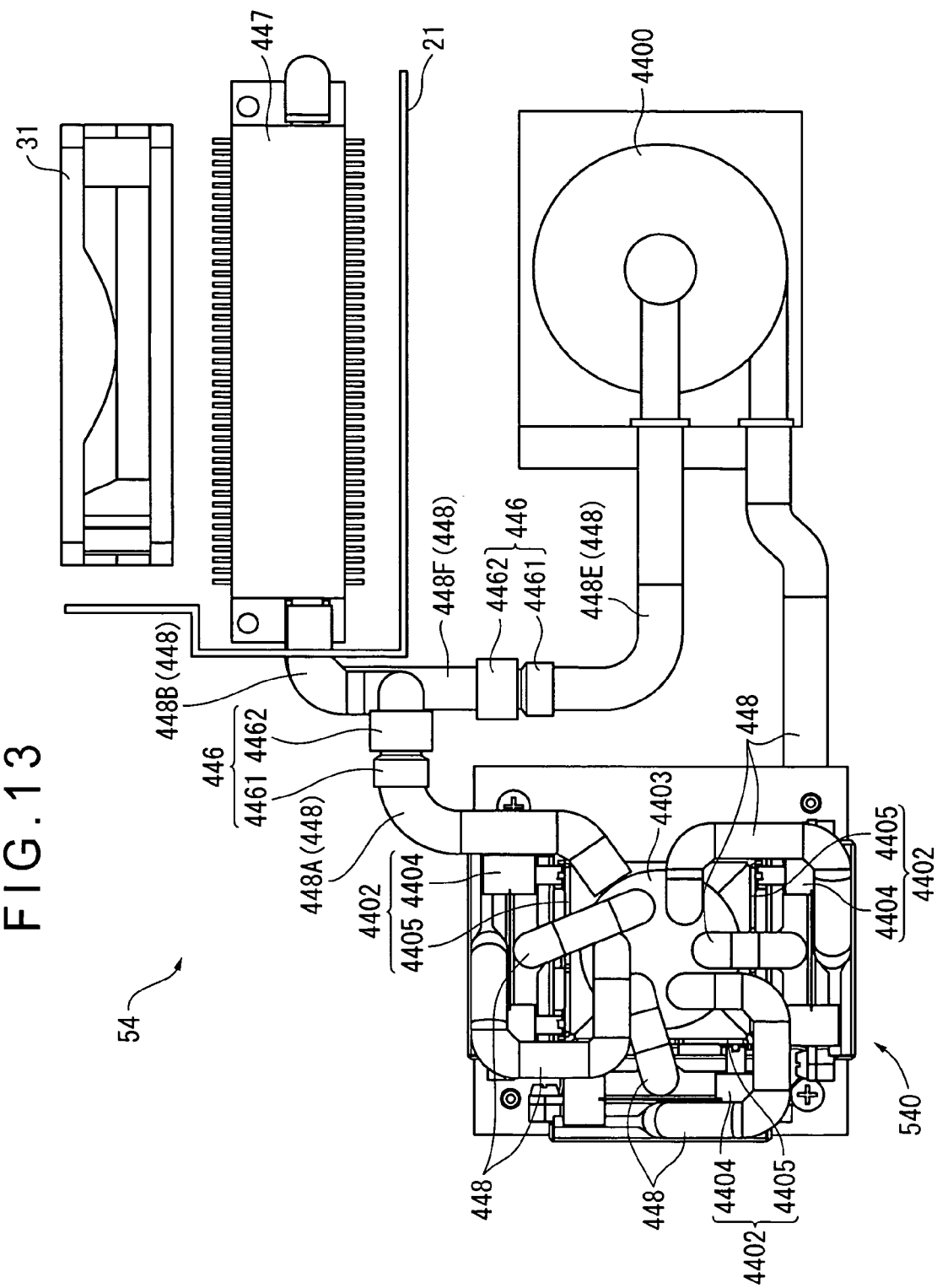
FIG. 13 is a plan view of an optical device of a second embodiment of the present invention.

FIG. 13 is a plan view of the optical device 54 of the second embodiment seen from above.

As shown in FIG. 13, the optical device 54 includes a radiator 447, a plurality of fluid circulating members 448 and a pair of fluid circulating member link sections 446, all of which are the same as their counterparts of the first embodiment, in addition to the optical device main body 540.

Since the main tank 545 is fitted to the fluid branching section 5401 and included in the optical device main body 540 in this embodiment, it is not arranged on the flow path between the radiator 447 and the pressurized fluid feeding section 4400 unlike the description of the first embodiment. The radiator 447 and the pressurized fluid feeding section 4400 are directly connected to each other by the corresponding fluid circulating member 448. As shown in FIG. 13, the fluid circulating member 448 connecting the radiator 447 and the pressurized fluid feeding section 4400 includes two fluid circulating members 448E, 448F, which are linked to each other by one of the pair of fluid circulating member link sections 446 so as to allow cooling fluid to flow through them.

The optical device main body 540 includes three liquid crystal panels 441, three incident-side polarization plates 442, three irradiation-side polarization plates 443, a cross dichroic prism 444, a pressurized fluid feeding section 4400, three optical modulator holders 4402 and a relay tank 4403, which are the same as their respective counterparts of the above-described embodiment, as well as a fluid branching section 5401 (see FIG. 14) and a main tank 545 that operates as cooling fluid accumulating section (see FIG. 14) and has a structure realized by integrating the above listed components 441 through 444, 4400, 4402, 4403, 5401 and 545.

Figure 14:
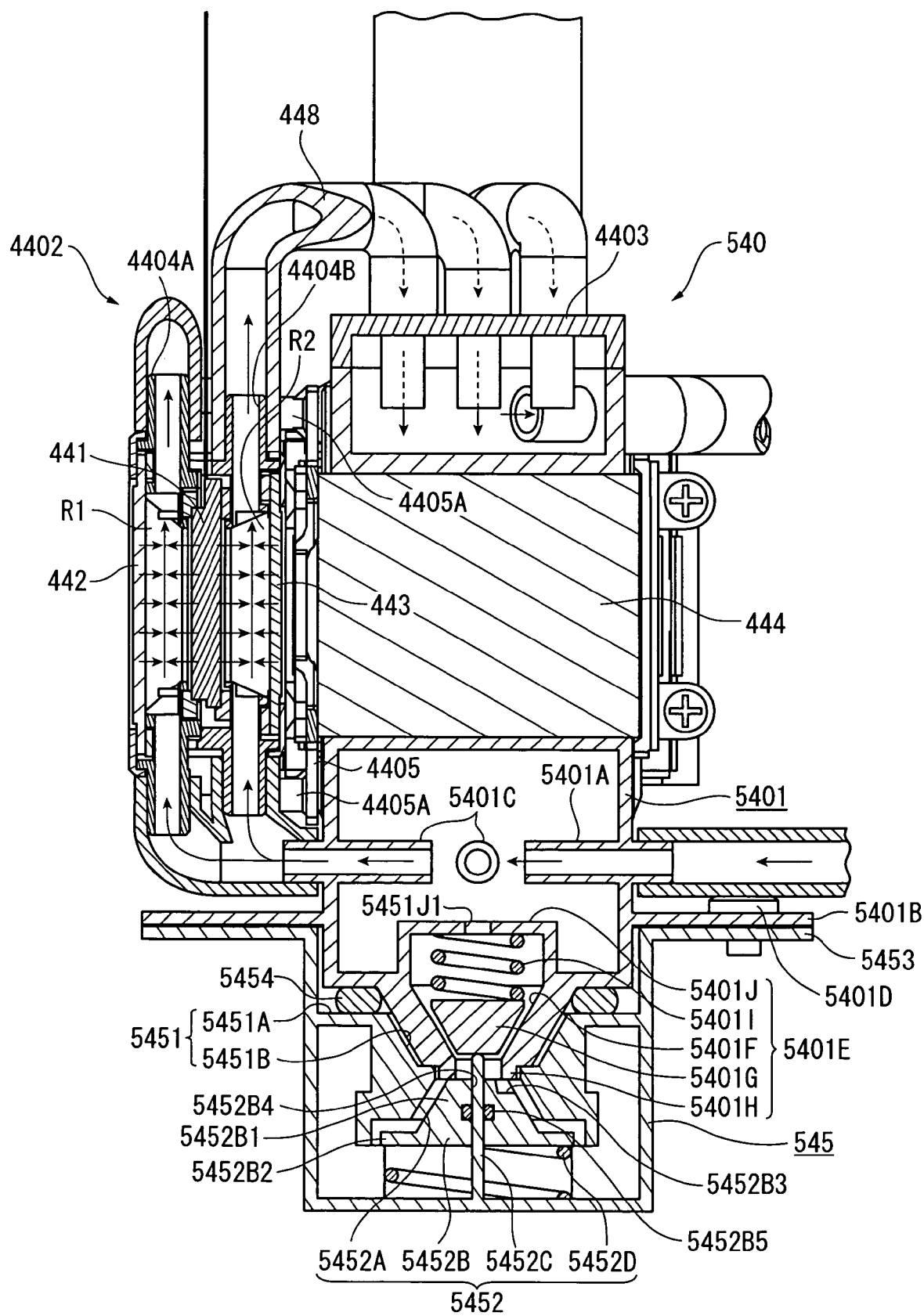
FIG. 14 is a cross sectional view of a fluid branching section and a main tank of the second embodiment.

FIG. 14 is a cross sectional view of the fluid branching section 5401 and the main tank 545, showing the structure thereof.

The fluid branching section 5401 is formed by using a hollow member showing a substantially cubic profile and made of aluminum. Like the fluid branching section 4401 of the above-described first embodiment, it is adapted to contain cooling fluid in the inside and to be hermetically sealed. It feeds in the cooling fluid that is forcibly fed out from the pressurized fluid feeding section 4400 and feeds out the fed in cooling fluid, dividing it for the three optical modulator holders 4402. It also operates as prism fixing plate for supporting the cross dichroic prism 444. The fluid branching section 5401 differs from the fluid branching section 4401 of the above-described first embodiment only in terms of profile.

As shown in FIG. 14, the fluid branching section 5401 is provided at the lateral side thereof corresponding to the light beam emitting side end facet of the cross dichroic prism 444 with a cooling fluid flow-in section 5401A that is similar to the cooling fluid flow-in section 4401A of the fluid branching section 4401 of the above-described first embodiment.

Additionally, as shown in FIG. 14, the fluid branching section 5401 is provided at the three lateral sides thereof corresponding to the light beam incident sides end facets of the cross dichroic prism 444 with three cooling fluid flow-out sections 5401C that are similar to the cooling fluid flow-out sections 4401C of the fluid branching section 4401 of the above-described first embodiment.

Still additionally, as shown in FIG. 14, the fluid branching section 5401 is provided at the four lateral sides thereof where the cooling fluid flow-in section 5401A and the cooling fluid flow-out sections 5401C with outwardly extending fixing sections 5401B. The fixing sections 5401B is connected to the main tank 545 by means of the fixing sections of the tank 545 and screws 5401D and rigidly secured to the component containing member 451 as the screws 5401D are driven into the component containing member 451 of the optical component casing 45.

Furthermore, as shown in FIG. 14, the fluid branching section 5401 is provided substantially at the center of the bottom thereof with a cooling fluid injecting section 5401E that is projecting downward from the bottom and adapted to receive cooling fluid injected into it from the main tank 545.

As shown in FIG. 14, the cooling fluid injecting section 5401E includes a cooling fluid flow-in hole 5401F, a flow-in valve 5401G, a valve moving section 5401H, a coil spring 5401I that operates as valve urging section and a coil spring support section 5401J.

The cooling fluid flow-in hole 5401F is a insertion hole that holds the inside and the outside of the fluid branching section 5401 in communication with each other via the cooling fluid flow-in section 5401E. When the main tank 545 is mounted in position, cooling fluid from the main tank 545 can be injected into the inside of the cooling fluid flow-in section 5401E. As shown in FIG. 14, the inner peripheral surface of the cooling fluid flow-in hole 5401F has a tapered part showing a profile corresponding to the outer profile of the cooling fluid flow-in section 5401E and adapted to abut the outer peripheral surface of the flow-in valve 5401G. The flow-in valve 5401G and the coil spring 5401I are arranged in the inside of the cooling fluid flow-in hole 5401F.

The flow-in valve 5401G has a tapered surface that corresponds to the profile of the inner peripheral surface of the cooling fluid flow-in hole 5401F and is adapted to close the cooling fluid flow-in hole 5401F as the tapered surface abuts the inner peripheral surface of the cooling fluid flow-in hole 5401F. As the flow-in valve 5401G is pressed by the valve moving section of the main tank 545, which will be described hereinafter, it is moved away from the tapered surface to open the cooling fluid flow-in hole 5401F.

The valve moving section 5401H is formed so as to project from the front end of the cooling fluid flow-in section 5401E and, when the main tank 545 is connected, it abuts the top surface of the feed valve of the main tank 545, which will be described hereinafter, to drive the feed-out valve to move in the direction of opening the cooling fluid feed-out hole of the main tank 545, which will also be described hereinafter.

The coil spring support section 5401J projects from the inner surface of the bottom of the fluid branching section 5401 and shows a profile that surrounds the flow-in valve 5401G and the coil spring 5401I arranged in the cooling fluid flow-in hole 5401F. The coil spring 5401I is pressed against the top wall of the coil spring support section 5401J at an end thereof. A communication hole 5401J1 is formed through the top wall of the coil spring support section 5401J to allow the inside of the fluid branching section 5401 and the cooling fluid flow-in hole 5401F to communicate with each other.

The coil spring 5401I is compressed so as to contact the coil spring support section 5401J at an end and the upper surface of the flow-in valve 5401G at the other end thereof so as to urge the flow-in valve 5401G to move in the direction of closing the cooling fluid flow-in hole 5401F. In other words, in a state where the main tank 545 does not connected to the fluid branching section 5401, the flow-in valve 5401G is urged by the coil spring 5401I to close the cooling fluid flow-in hole 5401F.

The main tank 545 is formed by a hollow member that has a substantially cubic profile and made of aluminum. The main tank 545 is adapted to be removably fitted to the fluid branching section 5401 so as to be able to feed out cooling fluid from the inside thereof into the fluid branching section 5401 when fitted to the section 5401.

As shown in FIG. 14, the main tank 545 is provided substantially at the center of the top surface thereof with a recess 5451. The recess 5451 has a stepped profile that corresponds to the outer profile of the fluid branching section 5401 to produce a recess 5451A showing a substantially prism-like profile and a recess 5451B showing a substantially cylindrical profile, the axial line of the recess 5451A and that of the recess 5451B being aligned relative to each other.

The recess 5451A is located above the recess 5451B and the bottom part of the fluid branching section 5401 is loosely received in the recess 5451A.

As shown in FIG. 14, the recess 5451B is adapted to receive in an upper part thereof the front end part of the cooling fluid flow-in section 5401E of the fluid branching section 5401. Thus, the recess 5451B has a tapered surface whose diameter is downwardly gradually reduced to make its profile match that of the outer peripheral surface of the front end part of the cooling fluid flow-in section 5401E. As shown in FIG. 14, the recess 5451B is provided at the bottom thereof with a cooling fluid feed-out section 5452 adapted to feed out cooling fluid from the inside thereof.

As shown in FIG. 14, the cooling fluid feed-out section 5452 includes a cooling fluid feed-out hole 5452A, a feed-out valve 5452B, a valve moving section 5452C and a coil spring 5452D that operates as valve urging portion.

The cooling fluid feed-out hole 5452A is a insertion hole formed at the bottom of the recess 5451B to make the inside of the main tank 545 communicate with the outside thereof so that cooling fluid can be fed out from the inside of the main tank 545. The cooling fluid feed-out hole 5452A has a substantially cylindrical profile that corresponds to the outer profile of the feed-out valve 5452B. The cooling fluid feed-out hole 5452A includes an upper part that shows tapered surface whose diameter is downwardly gradually increased and an lower part adapted to loosely receive the bottom of the feed-out valve 5452B.

The feed-out valve 5452B has a profile that is produced by combining two cylindrical members 5452B1, 5452B2 that have different diameters and are integrally put together so as to align their axes relative to each other. The feed-out valve 5452B is movable along the valve moving section 5452C to close the cooling fluid feed-out hole 5452A.

The cylindrical member 5452B1 is located above the cylindrical member 5452B2 and has a diameter smaller than that of the cylindrical member 5452B2.

As shown in FIG. 14, the cylindrical member 5452B1 has a tapered section in the outer periphery thereof whose diameter downwardly gradually increases so as to make its profile match that of the tapered surface of the cooling fluid feed-out hole 5452A. Thus, the outer surface of the tapered section abuts the above-described tapered surface of the cooling fluid feed-out hole 5452A.

Additionally, as shown in FIG. 14, the cylindrical member 5452B1 is provided at part of the upper surface thereof with a notch 5452B3 that extends from near the center to the outer periphery thereof so that cooling fluid is fed out from the inside to the outside via the notch 5452B3 when the feed-out valve 5452B is separated from the cooling fluid feed-out hole 5452A to open the cooling fluid feed-out hole 5452A.

The cylindrical member 5452B2 is arranged in such a way that its upper end facet closes the cooling fluid feed-out hole 5452A when the cylindrical member 5452B1 abuts the tapered surface of the cooling fluid feed-out hole 5452A.

Thus, the feed-out valve 5452B is adapted to close the cooling fluid feed-out hole 5452A as the cylindrical member 5452B1 and the cylindrical member 5452B2 are so arranged that the cylindrical member 5452B1 abuts the tapered surface of the cooling fluid feed-out hole 5452A while the cylindrical member 5452B2 closes the cooling fluid feed-out hole 5452A.

The feed-out valve 5452B is provided along the axis thereof with a insertion hole 5452B4 for allowing the valve moving section 5452C to move through in it. The insertion hole 5452B4 is provided at a substantially middle part thereof with an O-ring 5452B5 for tightly closing the gap between the insertion hole 5452B4 and the valve moving section 5452C. Thus, due to the provision of the O-ring 5452B5, the feed-out valve 5452B can move along the valve moving section 5452C without allowing cooling fluid to leak through the gap between the feed-out valve 5452B and the valve moving section 5452C.

The valve moving section 5452C is a substantially cylindrical rod-shaped member that is standing from the center of the bottom of the main tank 545 and has such a length that it can be snugly put into the cooling fluid flow-in hole 5401F of the fluid branching section 5401 when the main tank 545 is fitted to the fluid branching section 5401. The valve moving section 5452C is adapted to move the flow-in valve 5401G in the direction of opening the cooling fluid flow-in hole 5401F of the fluid branching section 5401 once the main tank 545 is connected to the fluid branching section 5401.

The coil spring 5452D is rigidly anchored at an end thereof to the bottom of main tank 545 and at the other end thereof to the bottom of the feed-out valve 5452B so as to urge the feed-out valve 5452B in the direction of closing the cooling fluid feed-out hole 5452A. In other words, when the main tank 545 is not fitted to the fluid branching section 5401, the feed-out valve 5452B is urged by the coil spring 5452D to keep the cooling fluid feed-out hole 5452A in a closed state.

As shown in FIG. 14, the main tank 545 is provided at the top surface thereof with a fixing section 5453 that extends outwardly.

Now, the method of fitting the main tank 545 to the fluid branching section 5401 will be described below.

Firstly, the valve moving section 5452C is driven into the cooling fluid flow-in hole 5401F of the fluid branching section 5401 until the front end of the valve moving section 5452C abuts the bottom of the flow-in valve 5401G of the fluid branching section 5401. As the main tank 545 is pressed against the fluid branching section 5401 further, the flow-in valve 5401G is pushed by the valve moving section 5452C so that the flow-in valve 5401G is driven to move upward in FIG. 14 against the urging force of the coil spring 5401I and eventually open the cooling fluid flow-in hole 5401F of the fluid branching section 5401. At this time, the valve moving section 5401H of the fluid branching section 5401 abuts the top surface of the feed-out valve 5452B of the main tank 545 and pushes the feed-out valve 5452B downward to open the cooling fluid feed-out hole 5452A of the main tank 545. As both the cooling fluid flow-in hole 5401F and the cooling fluid feed-out hole 5452A are opened, cooling fluid is fed out from the main tank 545 into the fluid branching section 5401 by way of the cooling fluid feed-out hole 5452A, the notch 5452B3 of the feed-out valve 5452B and the cooling fluid flow-in hole 5401F. Then, as screws 5401D are driven through the fixing section 5401B of the fluid branching section 5401 and the fixing section 5453 of the main tank 545 into the bottom of the exterior case 2, the main tank 545 and the fluid branching section 5401 are tightly bound to each other and, at the same time the main tank 545 is anchored to the exterior case 2. At this time, the O-ring 5454 is arranged between the button of the recess 5451A of the main tank 545 and the bottom of the fluid branching section 5401 so as to prevent cooling fluid from leaking through the gap between the main tank 545 and the fluid branching section 5401 that may otherwise be produced.

As described above in detail, since the main tank 545 is fitted to the fluid branching section 5401 and integrated into the optical device main body 540, it is possible to removably fit the optical device main body 540 to the radiator 447 in the optical device 54 by removably connecting the first link section 4461 and the second link section 4462 of each of the two fluid circulating member link sections 446 to each other.

The cooling structure for the liquid crystal panels 441, the incident-side polarization plates 442 and the irradiation-side polarization plates 443 of this embodiment is substantially identical with the cooling structure of the above-described first embodiment. It differs from the cooling structure of the first embodiment only in that cooling fluid circulates the flow path of the pressurized fluid feeding section 4400—the fluid branching section 5401—the optical modulator holders 4402—the relay tank 4403—the radiator 447—pressurized fluid feeding section 4400 and hence will not be described here any further.

If compared with the above-described first embodiment, the three liquid crystal panels 441, the three incident-side polarization plates 442, the three irradiation-side polarization plates 443, the cross dichroic prism 444, the pressurized fluid feeding section 4400, the fluid branching section 5401, the three optical modulator holders 4402 and the relay tank 4403 are integrally combined along with the main tank 545 in the second embodiment. In other words, the components of the optical device 54 are maximally integrated into the optical device main body 540 so that it is possible to efficiently lay out the components 4400, 4402, 4403, 5401, 545 and squeeze out the space for arranging the fluid circulating members 448 and hence the optical device 54 can be downsized and handled with ease.

Additionally, the number of connections in the above-described second embodiment is reduced because it is not necessary to connect the main tank 545 and the fluid branching section 5401 by the fluid circulating member 448. Therefore, it is further possible to prevent cooling fluid circulating in the optical device 54 from leaking.

Still additionally, since the main tank 545 can be removably fitted to the fluid branching section 5401, cooling fluid can be supplied with ease simply by replacing the main tank 545 if the volume of cooling fluid circulating in the optical device 54 is reduced.

Still additionally, the main tank 545 can be replaced by removing it from the fluid branching section 5401 and fitting a replacement main tank 545 to the fluid branching section 5401 simply by a one-touch operation so that a user of the projector 1 alone can easily supply cooling fluid into the optical device 54. Thus, the maintainability of the projector 1 is further improved.

Before the main tank 545 is fitted to the fluid branching section 5401, the cooling fluid flow-in hole 5401F of the fluid branching section 5401 is closed by the flow-in valve 5401G and the cooling fluid feed-out hole 5452A of the main tank 545 is closed by the feed-out valve 5452B. Therefore, neither the cooling fluid in the fluid branching section 5401 is exposed to the atmosphere via the cooling fluid flow-in hole 5401F nor the cooling fluid in the main tank 545 is exposed to the atmosphere via the cooling fluid feed-out hole 5452A before the main tank 545 is fitted to the fluid branching section 5401. Then, it is possible to prevent dust from entering the cooling fluid because the cooling fluid is not exposed to the atmosphere and hence the optical device main body 540 can maintain forming high quality images.

Additionally, since the cooling fluid flow-in section 5401E is provided with a coil spring 5401I, the flow-in valve 5401G is driven to move by the valve moving section 5452C of the main tank 545 and open the cooling fluid flow-in hole 5401F when the main tank 545 is fitted to the fluid branching section 5401 and the flow-in valve 5401G is urged to move by the coil spring 5401I of the fluid branching section 5401 and close the cooling fluid flow-in hole 5401F when the main tank 545 is removed from the fluid branching section 5401. Thus, cooling fluid does not leak from the inside of the fluid branching section 5401 to the outside thereof via the cooling fluid flow-in hole 5401F when the main tank 545 is removed from the fluid branching section 5401 during an operation of replacing the main tank 545 so that the cooling fluid is prevented from leaking into the projector 1 and the projector 1 is protected against stains, corrosion and short circuit accidents in the inside thereof that can otherwise take place when leakage of cooling fluid occurs to improve the reliability of the projector 1. Still additionally, the cooling fluid in the inside of the fluid branching section 5401 is not exposed to the outside via the cooling fluid flow-in hole 5401F and hence the optical device main body 540 can maintain forming high quality images.

Similarly, since the cooling fluid feed-out section 5452 is provided with a coil spring 5452D, the feed-out valve 5452B is driven to move by the valve moving section 5401H of the fluid branching section 5401 and open the cooling fluid feed-out hole 5452A when the main tank 545 is fitted to the fluid branching section 5401 and the feed-out valve 5452B urged to move by the coil spring 5452D of the main tank 545 and close the cooling fluid feed-out hole 5452A when the main tank 545 is removed from the fluid branching section 5401. Thus, the cooling fluid remaining in the main tank 545 does not leak out via the cooling fluid feed-out hole 5452A when the main tank 545 is removed from the fluid branching section 5401 during an operation of replacing the main tank 545 so that the cooling fluid is prevented from leaking into the projector 1 and the projector 1 is protected against stains, corrosion and short circuit accidents in the inside thereof that can otherwise take place when leakage of cooling fluid occurs to further improve the reliability of the projector 1.

While the present invention is described above by way of preferred embodiments, the present invention is by no means limited to those embodiments, which may be modified and altered in various different ways without departing from the scope of the present invention.

While each fluid circulating member link section 446 is formed by a first link section 4461 and a second link section 4462 in each of the above-described embodiment, the present invention is by no means limited thereto. For example, each fluid circulating member link section 446 may be realized as one piece by using a pipe-shaped member having a diameter greater or smaller than that of the fluid circulating members 448 that connects the fluid circulating members 448A, 448B, the fluid circulating members 448C, 448D or the fluid circulating members 448E, 448F.

The number and the positions of arrangement of the fluid circulating member link sections 446 of each of the above-described embodiments are not limited to those described above.

While the two fluid circulating member link sections 446 are arranged respectively between the main tank 445 and the pressurized fluid feeding section 4400 and between the radiator 447 and the relay tank 4403 in the first embodiment, the first embodiment is by no means limited thereto. It is sufficient to provide a fluid circulating member link section 446 that allows the optical modulator holders 4402 to be removably fitted to at least the main tank 445, the pressurized fluid feeding section 4400 or the radiator 447. For example, there may be provided two fluid circulating member link sections 446 respectively between the radiator 447 and the relay tank 4403 and between the pressurized fluid feeding section 4400 and the fluid branching section 4401 and the optical modulator holders 4402 may be removably fitted to the main tank 445, the pressurized fluid feeding section 4400 and the radiator 447. Similarly, there may be provided two fluid circulating member link sections 446 in the second embodiment respectively between the radiator 447 and the relay tank 4403 and between the pressurized fluid feeding section 4400 and the fluid branching section 5401 and the optical modulator holders 4402 may be removably fitted to the main tank 445, pressurized fluid feeding section 4400 and the radiator 447.

While the first link section 4461 and the second link section 4462 respectively have a first engaging section 4461D and a second engaging section 4462D that engage with each other to form a bayonet structure in the above description of each of the above-described embodiments, the present invention is by no means limited thereto. For example, a ball lock type or a bar type engagement structure may alternatively be adopted.

The second embodiment may additionally be arranged in the following way.

The lower case of the exterior case 2 is provided with an aperture at a position corresponding to the fluid branching section 5401. A lid-shaped member is fitted to the aperture to close it by engagement. With this arrangement, the main tank 545 can be removably fitted to the fluid branching section 5401 simply by removing the lid-shaped member from and open the aperture. Then, the operation of replacing the main tank 545 is further facilitated to dramatically improve the maintainability of the projector 1.

The configuration of the optical modulator holders 4402 of each of the above-described embodiments is by no means limited to the described one.

For example, each optical modulator holding member 4402 is provided with cooling chambers R1, R2 that are arranged respectively at the light beam incident side and the at the light beam emitting side of the corresponding liquid crystal panel 441 in each of the above-described embodiments, the embodiment is by no means limited thereto and each optical modulator holding member 4402 may be provided only with a single cooling chamber that is arranged at the light beam incident side or at the light beam emitting side.

Additionally, for example, a incident-side polarization plate 442 and an irradiation-side polarization plate 443 are arranged respectively at the light beam incident side and at the light beam emitting side of the paired frame-shaped members 4404A, 4404B of each optical modulator holder 4402 in each of the above-described embodiments, the embodiment is by no means limited thereto. Alternatively, a pair of light transmitting substrates such as glass substrates may be arranged respectively at the light beam incident side and at the light beam emitting side of the paired frame-shaped members 4404A, 4404B of each optical modulator holder 4402 so as to tightly close the apertures 4404A1, 4404B1 at a side of each of them.

While the main tank 545 is fitted to the fluid branching section 5401 from below in the above-described second embodiment, the second embodiment is by no means limited thereto, the main tank 545 may alternatively be fitted to the fluid branching section 5401 from above or from a lateral side of the section 5401.

While coil springs 4461C, 4462C, 5401I, 5452D are used for urging the flow valves including the flow valves in the above-described embodiments, the present invention is by no means limited thereto and they may be replaced by leaf springs or elastic resilient members typically made or rubber for urging the flow valves including the flow valves of a optical device according to the present invention.

While the fluid circulating members 448, the main tanks 445, 545, the pressurized fluid feeding sections 4400, the pipe-shaped members 4472 of the radiators 447, the frame-shaped members 4404A, 4404B, the relay tanks 4403 and the fluid circulating member link sections 446 of the above-described embodiments are made of aluminum, the present invention is by no means limited thereto and they may alternatively be made of any material other than aluminum so long as it is a corrosion-resistant material. For example, oxygen-free copper or duralumin may be used for the purpose of the present invention. The fluid circulating members 448 may be made of low hardness butyl rubber or fluorocarbon rubber so as to make them show small strain-reactive force and suppress displacement of pixels.

While cooling fluid is made to flow into the optical modulator holders 4402 substantially at the same flow rate in the above-described embodiments, the present invention is by no means limited thereto and cooling fluid may alternatively be made to flow into the optical modulator holders 4402 at different flow rates.

For example, a valve may be arranged in the flow path extending from the fluid branching section 4401 or 5401 to each optical modulator holder 4402 so as to narrow or broaden the flow path by shifting the valve position.

Alternatively, the fluid circulating members 448 connected to the fluid branching sections 4401, 5401 and the optical modulator holders 4402 may be made to have different diameters.

While the optical unit 4 is made to show a substantially L-shaped plan view in each of the above-described embodiments, the present invention is by no means limited thereto and it may alternatively be made to show a substantially U-shaped plan view.

While the projector 1 of each of the above-described embodiments includes three liquid crystal panels 441, the present invention is equally applicable to a projector using a single liquid crystal panel, a projector using two liquid crystal panels and a projector using four or more than four liquid crystal panels.

While transmission type liquid crystal panels having a light receiving surface and a light emitting surface that are different from each other are used for the above-described embodiments, the present invention is by no means limited thereto and reflection type liquid crystal panels having a surface that operates both as light receiving surface and as light emitting surface may alternatively be used for the purpose of the present invention.

While liquid crystal panels are used for the optical modulators of the above-described embodiments, optical modulators other than liquid crystal panels such as devices using micro-mirrors may alternatively be used for the purpose of the present invention. Then, the polarizing plates at the light beam incident side and the light beam emitting side of each optical modulator can be omitted.

While the projector of each of the above-described embodiment is a so-called front type projector adapted to project light from the front side of the screen as viewed from viewers, the present invention is also applicable to a rear type projector adapted to project light from the rear side of the screen as viewed from viewers.

While the best mode of carrying out the present invention is described above, the present invention is by no means limited to the above description. In other words, while the present invention is described in terms of illustrated specific embodiments, the described embodiments may be modified or altered in various different ways in terms of the profile, the material, the number and other details of each or each type of component without departing from the technological concept and the object of the present invention.

Therefore, the above description of the preferred embodiments that specifically describes the profile, the material and other aspects of each component are given only to facilitate a full understanding of the general concept of the present invention and any descriptions of the profiles and the materials of any of the components using denominations other than those contained herein should be found within the scope of the present invention.

The priority application Number JP2004-033591 upon which this patent application is based is hereby incorporated by reference.

What is claimed is:

1. An optical device having an optical modulator for modulating a light beam emitted from a light source according to image information, the device comprising:
    an optical modulator holder having a cooling chamber formed therein, the cooling chamber containing cooling fluid therein in a hermetically sealed state, and holding the optical modulator so as to be capable of transmitting heat to the cooling fluid in the cooling chamber;
    a plurality of fluid circulating members connected to and communicating with the cooling chamber of the optical modulator holder and adapted to guide the cooling fluid to the outside of the cooling chamber and back into the cooling chamber;
    fluid circulating member link sections adapted to link the plurality of fluid circulating members;
    a cooling fluid accumulating section arranged on a flow path of the cooling fluid of the plurality of fluid circulating members to accumulate cooling fluid;
    a pressurized fluid feeding section arranged on the flow path of the cooling fluid of the plurality of fluid circulating members to feed cooling fluid under pressure via the plurality of fluid circulating members and forcibly circulate it; and
    a heat emitting section arranged on the flow path of the cooling fluid of the plurality of fluid circulating members to emit heat from the cooling fluid, wherein
    the fluid circulating member link sections are arranged at least at two positions interlinking the cooling fluid accumulating section, the pressurized fluid feeding section, the heat emitting section and the optical modulator holder; and
    the optical modulator holder is removably fitted at least to the cooling fluid accumulating section, the pressurized fluid feeding section or the heat emitting section.

2. The optical device according to claim 1, wherein
    a plurality of optical modulators and a plurality of optical modulator holders are provided, the number of optical modulator holders being corresponding to the number of optical modulators; the optical device further comprising:
    a color combining optical device having a plurality of light beam incident side end facets for receiving the plurality of optical modulator holders fitted thereto and adapted to combine light beams of different colors modulated by the plurality of optical modulators and emit the combined light beam;
    a fluid branching section fitted to either of the end facets intersecting the plurality of light beam incident side end facets of the color combining optical device and dividing internal cooling fluid for and feeding it out to the plurality of optical modulator holders via the plurality of the fluid circulating members; and
    a cooling fluid relay section fitted to the other end facet intersecting the plurality of light beam incident side end facets of the color combining optical device and adapted to collectively feed in the plurality of cooling fluid from the optical modulator holders via the plurality of fluid circulating members;
    an optical device main body being formed by integrating the plurality of optical modulator holders, the color combining optical device, the fluid branching section and the cooling fluid relay section;
    the fluid circulating member link sections being arranged at least at two positions interlinking the cooling fluid accumulating section, the pressurized fluid feeding section, the heat emitting section and the optical device main body;
    the optical device main body being removably fitted at least to the cooling fluid accumulating section, the pressurized fluid feeding section or the heat emitting section.

3. The optical device according to claim 2, wherein
    the pressurized fluid feeding section is arranged upstream of flowing cooling fluid relative to the fluid branching section and integrated with the fluid branching section by one of the fluid circulating members; and
    the optical device main body is formed to include the pressurized fluid feeding section; while
    the cooling fluid accumulating section and the heat emitting section are integrated by means of another one of the fluid circulating members and arranged on the flow path of cooling fluid flowing out from the cooling fluid relay section to the pressurized fluid feeding section; and
    the fluid circulating member link sections are arranged respectively between the cooling fluid accumulating section and the heat emitting section and the cooling fluid relay section and between the cooling fluid accumulating section and the heat emitting section and the pressurized fluid feeding section; the optical device main body being removably fitted to the cooling fluid accumulating section and the heat emitting section.

4. The optical device according to claim 2, wherein
    the fluid branching section has a cooling fluid flow-in section for allowing cooling fluid to flow into the inside thereof and the cooling fluid accumulating section has a cooling fluid feed-out section for allowing cooling fluid to be fed out to the outside thereof and is adapted to be removably fitted to the fluid branching section so that, when the cooling fluid accumulating section is fitted to the fluid branching section, the cooling fluid flow-in section and the cooling fluid feed-out section are connected to each other to flow cooling fluid into the fluid branching section; while
    the optical device main body is formed to include the cooling fluid accumulating section; and
    the fluid circulating member link sections are arranged at least at two positions interlinking the pressurized fluid feeding section, the heat emitting section and the optical device main body, the optical device main body being removably fitted at least to the pressurized fluid feeding section or the heat emitting section.

5. The optical device according to claim 4, wherein
    the pressurized fluid feeding section is arranged upstream of flowing cooling fluid relative to the fluid branching section and integrated with the fluid branching section by one of the fluid circulating members;
    and the optical device main body is formed to include the pressurized fluid feeding section, while the fluid circulating member link sections are arranged respectively on the flow path from the optical device main body to the heat emitting section and on the flow path from the heat emitting section to the optical device main body, the optical device main body being removably fitted to the heat emitting section.

6. The optical device according to claim 4, wherein
    the cooling fluid flow-in section is formed to include a cooling fluid flow-in hole adapted to flow cooling fluid into the inside thereof and a flow-in valve for closing the cooling fluid flow-in hole; and the cooling fluid feed-out section is formed to include a cooling fluid feed-out hole adapted to feed out cooling fluid to the outside thereof and a feed-out valve for closing the cooling fluid feed-out hole;

the fluid branching section and the cooling fluid accumulating section being provided respectively with valve moving sections for moving the feed-out valve and the flow-in valve so as to open the cooling fluid feed-out hole and the cooling fluid flow-in hole at the time of being connected to each other.

7. The optical device according to claim 6, wherein the cooling fluid flow-in section and the cooling fluid feed-out section have respective valve urging sections for urging the flow-in valve and the feed-out valve to close the cooling fluid flow-in hole and the cooling fluid feed-out hole.

8. The optical device according to claim 1, wherein the fluid circulating member link sections are arranged corresponding to the fluid circulating members to be linked and each of the fluid circulating member link sections includes a first link section and a second link section adapted to be connected to each other to link the related fluid circulating members;

the first link section and the second link section being formed to include a flow hole for allowing cooling fluid to flow in the inside, a flow valve for closing the flow hole, a valve moving section for moving the flow valve to open the flow hole when the first link section and the second link section are connected to each other and an engaging section adapted to engage each other.

9. The optical device according to claim 8, wherein the first link sections and the second link sections are provided with respective flow valve urging sections for urging the flow valves to close the flow holes.

10. A projector comprising a light source device, an optical device having an optical modulator for modulating a light beam emitted from a light source according to image information, and a projection optical device for enlarging and projecting the optical image formed by the optical device; the projector further comprising:

an optical modulator holder having a cooling chamber formed therein, the cooling chamber containing cooling fluid therein in a hermetically sealed state, and holding the optical modulator so as to be capable of transmitting heat to the cooling fluid in the cooling chamber;

a plurality of fluid circulating members connected to and communicating with the cooling chamber of the optical modulator holder and adapted to guide the cooling fluid to the outside of the cooling chamber and back into the cooling chamber;

fluid circulating member link sections adapted to link the plurality of fluid circulating members;

a cooling fluid accumulating section arranged on a flow path of the cooling fluid of the plurality of fluid circulating members to accumulate cooling fluid;

a pressurized fluid feeding section arranged on the flow path of the cooling fluid of the plurality of fluid circulating members to feed cooling fluid under pressure via the plurality of fluid circulating members and forcibly circulate it; and a heat emitting section arranged on the flow path of the cooling fluid of the plurality of fluid circulating members to emit heat from the cooling fluid, wherein the fluid circulating member link sections are arranged at least at two positions interlinking the cooling fluid accumulating section, the pressurized fluid feeding section, the heat emitting section and the optical modulator holder; and the optical modulator holder is removably fitted at least to the cooling fluid accumulating section, the pressurized fluid feeding section or the heat emitting section.

11. The projector according to claim 10, wherein a plurality of optical modulators and a plurality of optical modulator holders are provided, the number of optical modulator holders being corresponding to the number of optical modulators; the projector further comprising:

a color combining optical device having a plurality of light beam incident side end facets for receiving the plurality of optical modulator holders fitted thereto and adapted to combine light beams of different colors modulated by the plurality of optical modulators and emit the combined light beam;

a fluid branching section fitted to either of the end facets intersecting the plurality of light beam incident side end facets of the color combining optical device and dividing internal cooling fluid for and feeding it out to the plurality of optical modulator holders via the plurality of the fluid circulating members; and a cooling fluid relay section fitted to the other end facet intersecting the plurality of light beam incident side end facets of the color combining optical device and adapted to collectively feed in the plurality of cooling fluid from the optical modulator holders via the plurality of fluid circulating members;

an optical device main body being formed by integrating the plurality of optical modulator holders, the color combining optical device, the fluid branching section and the cooling fluid relay section;

the fluid circulating member link sections being arranged at least at two positions interlinking the cooling fluid accumulating section, the pressurized fluid feeding section, the heat emitting section and the optical device main body;

the optical device main body being removably fitted at least to the cooling fluid accumulating section, the pressurized fluid feeding section or the heat emitting section.

12. The projector according to claim 11, wherein the pressurized fluid feeding section is arranged upstream of flowing cooling fluid relative to the fluid branching section and integrated with the fluid branching section by one of the fluid circulating members; and the optical device main body is formed to include the pressurized fluid feeding section; while the cooling fluid accumulating section and the heat emitting section are integrated by means of another one of the fluid circulating members and arranged on the flow path of cooling fluid flowing out from the cooling fluid relay section to the pressurized fluid feeding section; and the fluid circulating member link sections are arranged respectively between the cooling fluid accumulating section and the heat emitting section and the cooling fluid relay section and between the cooling fluid accumulating section and the heat emitting section and the pressurized fluid feeding section; the optical device main body being removably fitted to the cooling fluid accumulating section and the heat emitting section.

13. The projector according to claim 11, wherein the fluid branching section has a cooling fluid flow-in section for allowing cooling fluid to flow into the inside thereof and the cooling fluid accumulating section has a cooling fluid feed-out section for allowing cooling fluid to be fed out to the outside thereof and is adapted to be removably fitted to the fluid branching section so that, when the cooling fluid accumulating section is fitted to the fluid branching section, the cooling fluid flow-in section and the cooling fluid feed-out section are connected to each other to flow cooling fluid into the fluid branching section; while the optical device main body is formed to include the cooling fluid accumulating section; and the fluid circulating member link sections are arranged at least at two positions interlinking the pressurized fluid feeding section, the heat emitting section and the optical device main body, the optical device main body being removably fitted at least to the pressurized fluid feeding section or the heat emitting section.

14. The projector according to claim 13, wherein the pressurized fluid feeding section is arranged upstream of flowing cooling fluid relative to the fluid branching section and integrated with the fluid branching section by one of the fluid circulating members;

and the optical device main body is formed to include the pressurized fluid feeding section, while the fluid circulating member link sections are arranged respectively on the flow path from the optical device main body to the heat emitting section and on the flow path from the heat emitting section to the optical device main body, the optical device main body being removably fitted to the heat emitting section.

15. The projector according to claim 13, wherein the cooling fluid flow-in section is formed to include a cooling fluid flow-in hole adapted to flow cooling fluid into the inside thereof and a flow-in valve for closing the cooling fluid flow-in hole; and the cooling fluid feed-out section is formed to include a cooling fluid feed-out hole adapted to feed out cooling fluid to the outside thereof and a feed-out valve for closing the cooling fluid feed-out hole;

the fluid branching section and the cooling fluid accumulating section being provided respectively with valve moving sections for moving the feed-out valve and the flow-in valve so as to open the cooling fluid feed-out hole and the cooling fluid flow-in hole at the time of being connected to each other.

16. The projector according to claim 15, wherein the cooling fluid flow-in section and the cooling fluid feed-out section have respective valve urging sections for urging the flow-in valve and the feed-out valve to close the cooling fluid flow-in hole and the cooling fluid feed-out hole.

17. The projector according to claim 10, wherein the fluid circulating member link sections are arranged corresponding to the fluid circulating members to be linked and each of the fluid circulating member link sections includes a first link section and a second link section adapted to be connected to each other to link the related fluid circulating members;

the first link section and the second link section being formed to include a flow hole for allowing cooling fluid to flow in the inside, a flow valve for closing the flow hole, a valve moving section for moving the flow valve to open the flow hole when the first link section and the second link section are connected to each other and an engaging section adapted to engage each other.

18. The projector according to claim 17, wherein the first link sections and the second link sections are provided with respective flow valve urging sections for urging the flow valves to close the flow holes.

* * * * *